INVENTORS.
FRANK KESSLER
WILLIAM W. PHARIS
BY T. L. Bowes
ATTORNEY

*INVENTORS.*
FRANK KESSLER
WILLIAM W. PHARIS

*BY* T. L. Bowes

ATTORNEY

LINE FINDER

INVENTORS.
FRANK KESSLER
WILLIAM W. PHARIS
BY T. L. Bowes
ATTORNEY

INVENTORS.
FRANK KESSLER
WILLIAM W. PHARIS
BY T. L. Bowes
ATTORNEY

INVENTORS.
FRANK KESSLER
WILLIAM W. PHARIS
BY T. L. Bowes
ATTORNEY

CONNECTOR

INVENTORS.
FRANK KESSLER
WILLIAM W. PHARIS
BY T. L. Bowes
ATTORNEY

INVENTORS.
FRANK KESSLER
WILLIAM W. PHARIS
BY T. L. Bowes
ATTORNEY

INVENTORS.
FRANK KESSLER
WILLIAM W. PHARIS
BY T. L. Bowes
ATTORNEY

Dec. 6, 1955 F. KESSLER ET AL 2,726,284

AUTOMATIC TELEPHONE SYSTEM

Original Filed Sept. 13, 1949 13 Sheets-Sheet 9

INVENTORS.
FRANK KESSLER
WILLIAM W. PHARIS

BY *T. L. Bowes*

ATTORNEY

Dec. 6, 1955 F. KESSLER ET AL 2,726,284

AUTOMATIC TELEPHONE SYSTEM

Original Filed Sept. 13, 1949 13 Sheets-Sheet 10

INVENTORS.
FRANK KESSLER
WILLIAM W. PHARIS

BY T. L. Bowes

ATTORNEY

INVENTORS.
FRANK KESSLER
WILLIAM W. PHARIS
BY T. L. Bowes
ATTORNEY

AUTOMATIC TELEPHONE SYSTEM

Original Filed Sept. 13, 1949 13 Sheets-Sheet 12

INVENTORS.
FRANK KESSLER
WILLIAM W. PHARIS
BY T. L. Bowes
ATTORNEY

NOTES
1. FIRST LINE OF P.B.X. GROUP HAS HS TERMINAL CONNECTED TO (+)
2. LAST LINE OF P.B.X. GROUP HAS HS AND S TERMINALS CONNECTED TOGETHER

*INVENTORS.*
FRANK KESSLER
WILLIAM W. PHARIS
*BY* T. L. Bowes
ATTORNEY

United States Patent Office 2,726,284

Patented Dec. 6, 1955

2,726,284

AUTOMATIC TELEPHONE SYSTEM

Frank Kessler, Los Angeles, Calif., and William W. Pharis, Rochester, N. Y., assignors, by mesne assignments, to General Dynamics Corporation, a corporation of Delaware Original application September 13, 1949, Serial No. 115,392. Divided and this application October 18, 1951, Serial No. 251,962

5 Claims. (Cl. 179—18)

This invention relates to telephone systems and it more particularly pertains to automatic telephone systems using step by step switches.

The present application is a division of our copending application Serial No. 115,392, filed September 13, 1949, now Patent 2,668,194, issued February 2, 1954.

It is the main object of the present invention to provide improved circuits, of the character later described, which render the equipment simple and economical and which function in a positive and reliable manner to provide dial service in a telephone exchange.

For the purpose of simplifying the illustrations and facilitating the explanation, various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. For example, the various relays and their contacts are illustrated in a conventional manner, with all of the contacts controlled by a particular relay being associated with this relay by means of a dashed line. Instead of making use of the usual battery and ground connections usually found in telephone circuits, it has been found convenient to indicate the connections to the negative side of the common battery by the (—) symbol and to illustrate the connections to the positive or ground terminal of the battery by means of the (+) symbol, it being understood that these corresponding symbols on all of the drawings in the present disclosure connect to the same terminals of the common source of current.

It is an object of the invention to provide a telephone system having an improved connector circuit of universal application with simplified means to control the extension of ringing current for either toll or local calls.

Another object of the present invention is the provision of a lock pulse arrangement in the selector and in the connector, whereby an impulse repeating relay is controlled by the usual impulse relay which responds to impulses in the line circuit, this additional impulse repeating relay being arranged to operate when the usual impulse relay releases, locks itself operated, control the stepping operation of the associated selector switch, after which its locking circuit is opened and the relay is released when the line impulse relay next operates. In other words the impulse repeating relay is operated in response to an impulse and remains operated for energizing the stepping magnet until said magnet is actually operated.

The novel features believed to be characteristic of the invention are set forth in the appended claims. The invention, both as to its organization and method of operation, together with further objects and advantages thereof, will best be understood by reference to the following specification taken in connection with the accompanying drawings in which like characters designate corresponding parts and in which:

Figure 11:
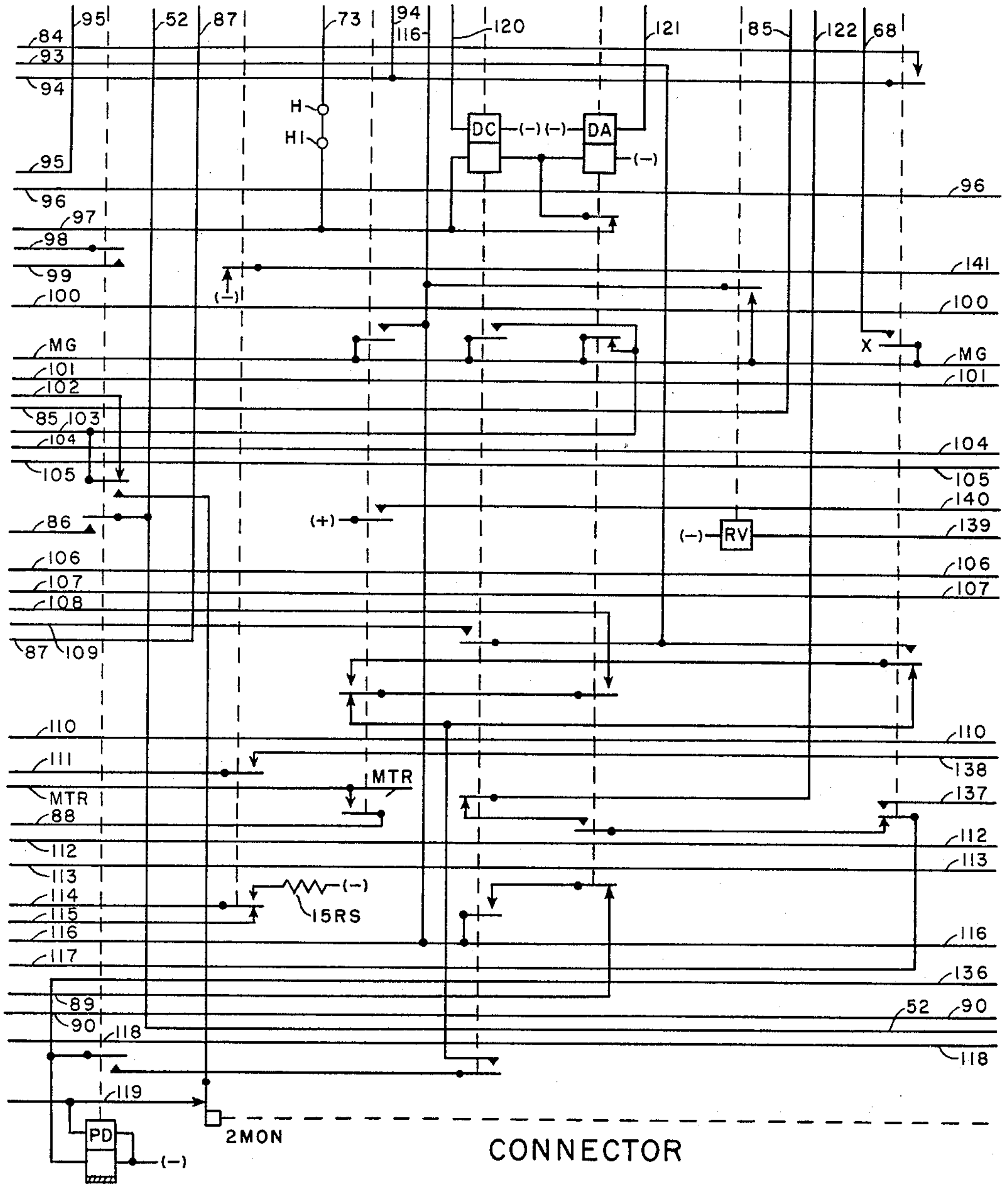
Figure 12:
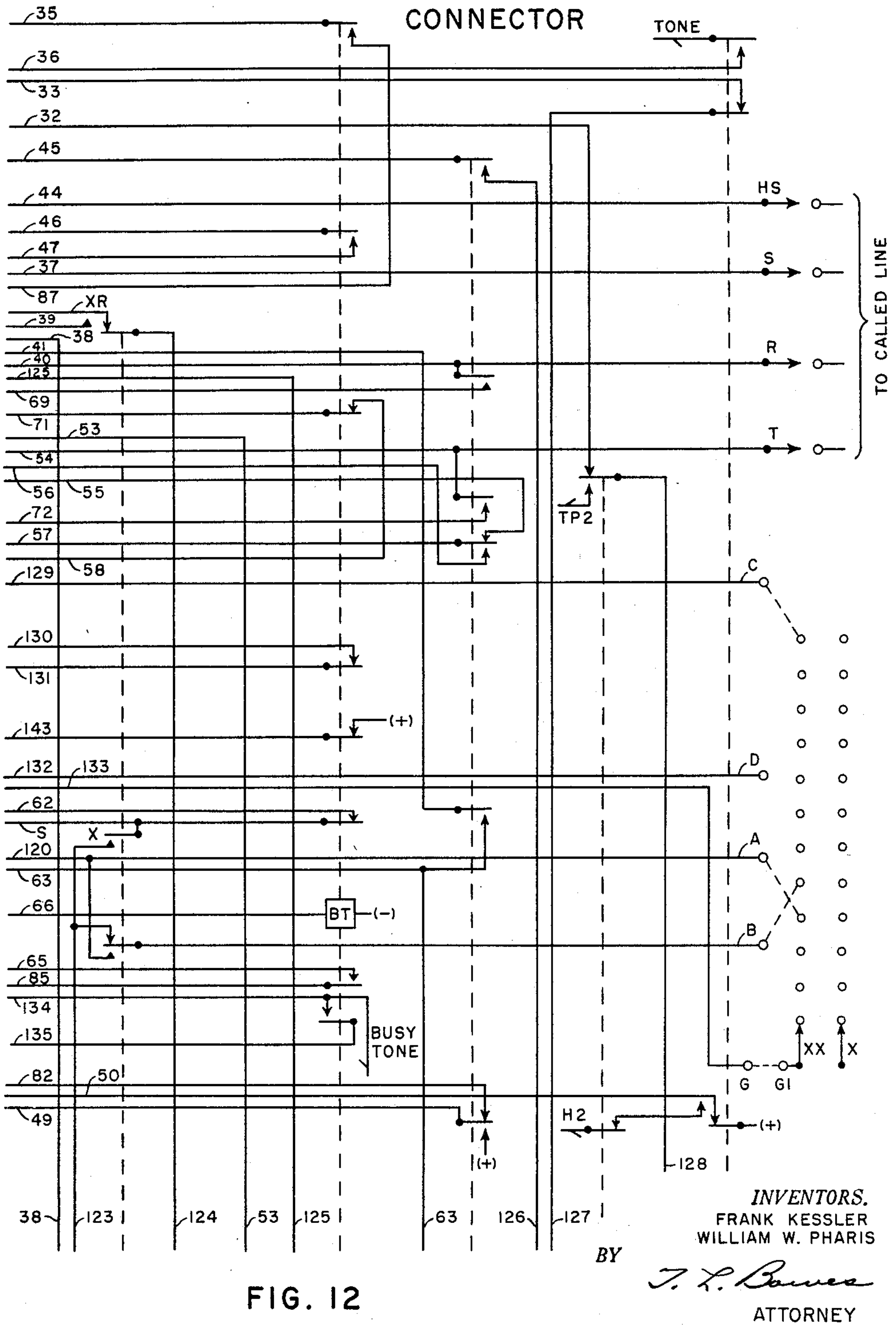
Figure 13:
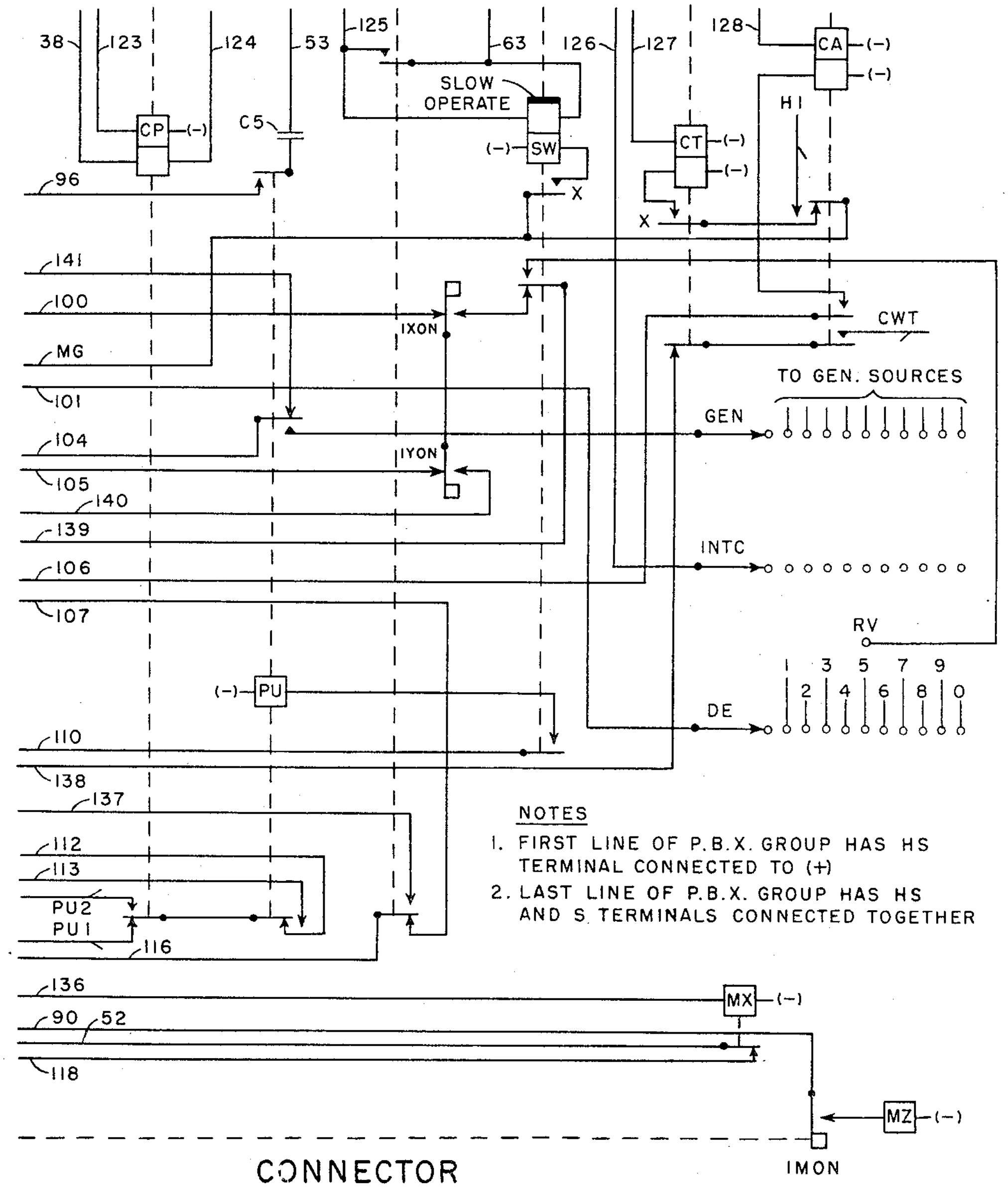

Figs. 6 to 13, inclusive, show the circuits and apparatus of a typical connector used in the system of the present embodiment, with the minor switch which is associated with the connector being shown in Fig. 13.

Figure 1:
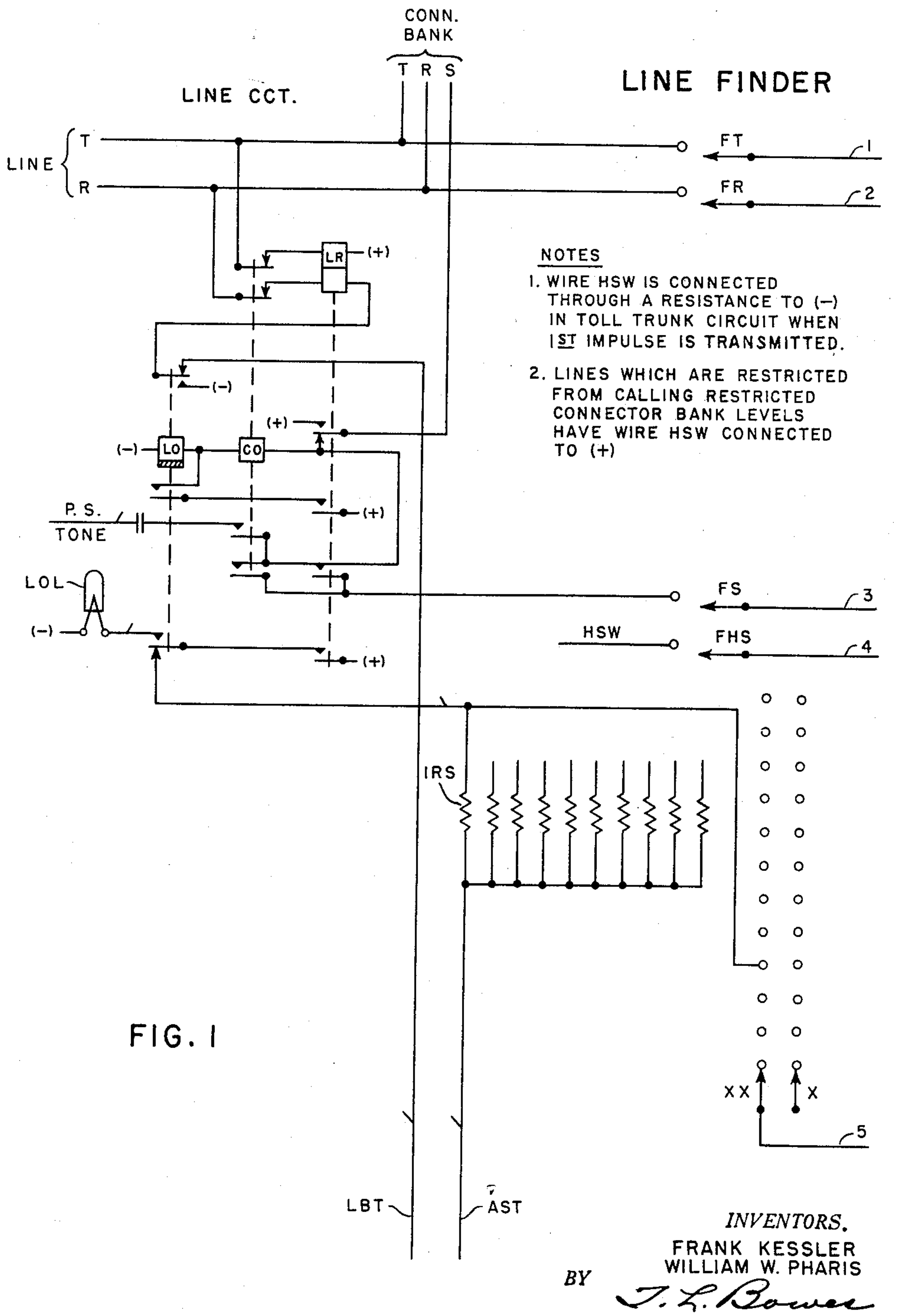
Fig. 1 illustrates the circuits and apparatus for one of the lines of the system, with a portion of a line finder illustrated at the right hand portion of this figure.
Figure 2:
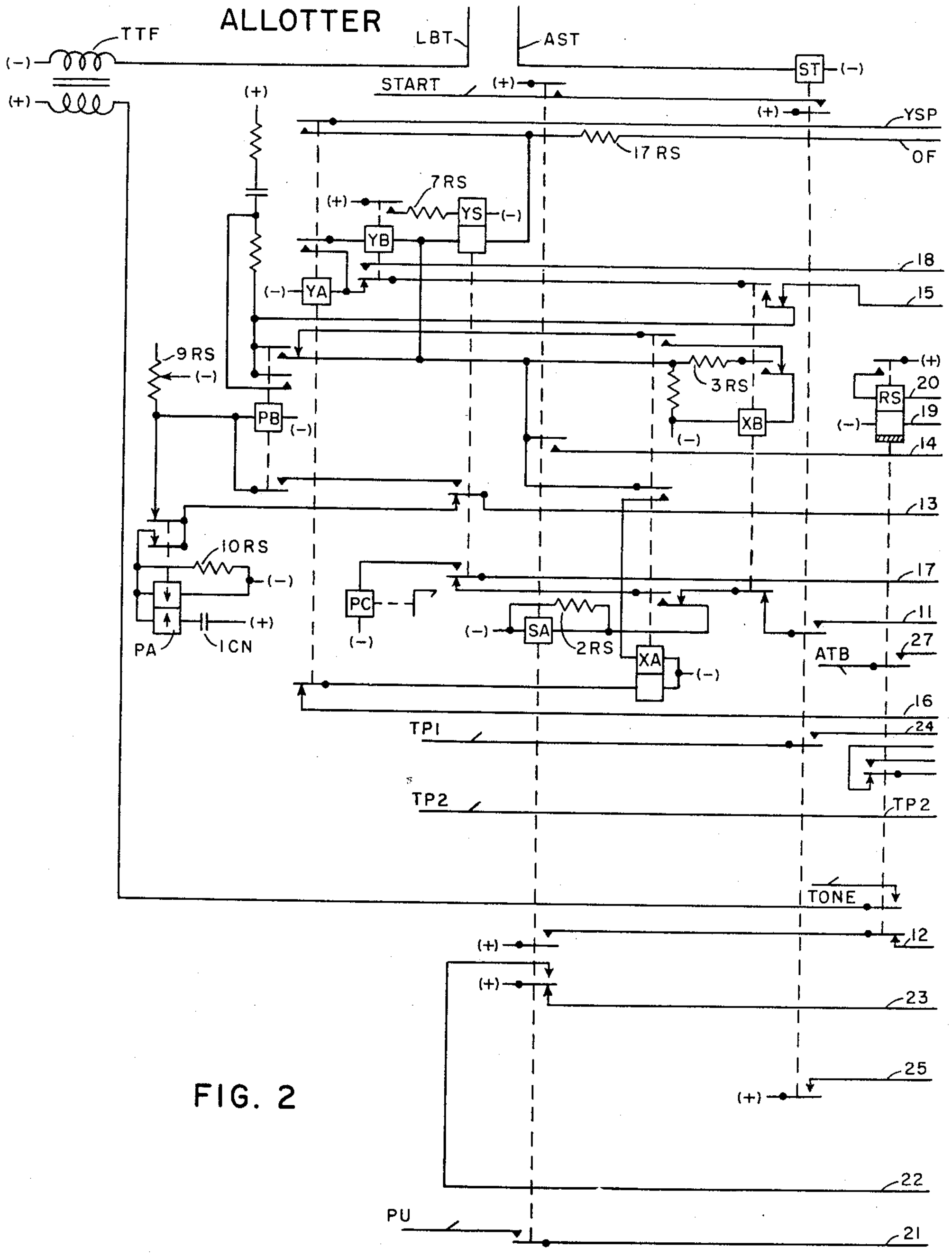
Figs. 2 and 4 show the circuits and apparatus of the common allotter used in connection with the allotment of the finder-selector links of the system.

It is believed that the operation of the system, together with the features disclosed, will best be understood by describing a typical call originated on the line circuit of Fig. 1 and extending to a connector terminal, illustrated in Fig. 12 and indicated "to called line," assuming that the calling line number is 33 and that the called line designation is 2222.

*Line, line finder and allotter operation*

When the receiver is removed at the calling station, the closed circuit across the calling line effects the operation of the line relay LR of the associated line circuit, this circuit being traced from (+), upper winding of line relay LR, break contact of cut off relay CO, upper side of the calling line T and the substation in series, lower side of the calling line R, break contact of relay CO, lower winding of relay LR, break contact of lockout relay LO, common link busy tone conductor LBT and upper winding of tone transformer TTF to (—). The operation of relay LR immediately makes this line busy by applying (+) to sleeve conductor S leading to the connector banks. The operation of relay LR also marks the level in which the calling line is located by applying (+) by way of the lowermost make contact of relay LR and break contact of relay LO to the third off normal level terminal in the XX bank of the line finder. The operation of relay LR also marks the terminal in the level associated with the calling line by applying (—) to the terminal of brush FS of the finder over a circuit which may be traced from (—), winding of relay LO, winding of relay CO, make contact of relay LR and the terminal to which wiper FS of the finder makes contact.

The operation of relay LR closes a circuit for operating start relay ST of the allotter extending from (+), lowermost make contact of relay LR, break contact of relay LO, resistor 1RS, common start conductor AST and winding of start relay ST of the allotter to (—). The operation of relay ST closes a circuit for operating relay SA of the associated allotter which may be traced from (+), break contact of relay LS, conductor 11, make contact of relay ST, break contact of relay XB, break contact of relay XA and winding of relay SA to (—). Relay SA is bridged by resistor 2RS to render this relay slightly slow to release.

When relay SA of the allotter is operated, a circuit is closed for operating relay ST of the allotted line finder which may be traced from (+), make contact of relay SA, break contact of relay RS, conductor 12, make contact of relay 1AL, conductor 1FST, break contact of relay SW and winding of relay ST to (—). With either relay ST of relay SA of the allotter operated, the common start conductor is energized for starting up the mechanism which provides timed pulses on the common timing conductors for a purpose which will be later described. It will be noted that relay 1AL is locked operated over a circuit extending from (+), make contact of relay 1AL, conductor 1AL, break contact of relay SW, X off normal contact XON and Y off normal contact YON of the line finder, conductor 1ALG and lower winding of relay 1AL to (−). The operation of relay ST of the line finder closes a bridge around the X and Y off normal contacts to maintain this locking circuit for relay 1AL complete even while the line finder is operated in its X and Y directions.

The pulsing relays PA and PB of the allotter are now started operating by means of a circuit on pulse conductor PG extending from (+), make contact of relay ST of the line finder, conductor PG, make contact of relay 1AL, break contact of relay LS, conductor 13, break contact of relay YS, break contacts of relay PA to the operating windings of relays PA and PB to (−). At the same time that this circuit is closed, another circuit from this same (+) extends through the lower winding of relay PA and condenser 1CN to (+). Before this circuit is closed by way of conductor PG, condenser 1CN is charged over a circuit including both windings in series of relay PA. Now when (+) is applied to the PG conductor, the condenser discharges through the lower winding of relay PA in such a direction that the current flow through this lower winding opposes that through the upper winding, this resulting in the slow operation of relay PA, the time of operation of this relay being determined by the time of discharge of the condenser. Relay PB of course operates before relay PA.

When relay PA operates, the above described circuit for relay PB is opened and this latter relay releases. It is slightly slow to release because of resistor 9RS bridged across its winding. The operation of relay PA also opens up the above described circuit to its own winding for effecting the release of this relay. Relay PA is slow to release after its upper winding is de-energized because of the charge current for condenser 1CN which now flows through both windings of relay PA in series aiding relation, thus holding this relay operated until the charge cycle of the condenser reaches a predetermined point. Relay PA is also slowed up in its release by resistor 10RS. When relay PA releases, the above described circuits for this relay and the PB relay are again closed and these relays repeat the above described cycle. This continues with relays PA and PB pumping along to provide pulses for operating magnet X of the line finder over a circuit which will now be described. Each time relay PB operates, a circuit is closed for operating the X magnet of the allotted finder traced from (+), break contact of relay LS, break contact of relay AS, conductor 14, make contact of relay SA, make contact of relay PB, break contact of relay XB, conductor 15, make contact of relay 1AL, conductor XM and winding of magnet X to (−).

When the marked level is reached by the line finder (level 3 in this example) a circuit is closed for the X magnet stop relay XA in the allotter which may be traced from (+), make contact of relay LR of the line circuit, break contact of relay LO, terminal and wiper XX of the operating line finder, conductor 5, X stop conductor XSP, make contact of relay 1AL of the allotter, break contact of relay AS, conductor 16, break contact of relay YA and lower winding of relay XA to (−). Relay XA closes a locking circuit for itself extending from (+), break contacts in series of relays LS and AS, conductor 14, make contact of relay SA, make contact and upper winding of relay XA to (−). When relay XA operates, a substitute circuit is closed for relay SA which is independent of the previously described circuit including conductor 11, this substitute circuit extending from (+), break contact of relay LS, conductor 17, break contact of relay YS, make contact of relay XA and winding of relay SA to (−). This operation of relay XA occurs during the time that relay PB is operated for stepping the finder switch to the marked level and during the time that relay PA is operated for effecting the release of relay PB. Now when relay PB releases, a circuit is closed for operating relay XB of the allotter extending from (+), break contacts in series of relays LS and AS, conductor 14, make contact of relay SA, break contact of relay PB, make contact of relay XA, break contact and winding of relay XB to (−). Relay XB closes a locking circuit for itself extending from the above described circuit including conductor 14, make contact of relay SA, resistor 3RS, make contact and winding of relay XB to (−).

When relay PB operates the next time it does not close a circuit to the X magnet of the line finder because this circuit, including conductor 15, is open at the break contact of relay XB. This operation of relay PB does close a circuit, however, for relay YA which may be traced from (+) on conductor 14, make contact of relay SA, make contact of relay PB, make contact of relay XB, break contact of relay YB and winding of relay YA to (−). When relay PB is next released a circuit is closed for operating relay YB and for locking relay YA, this circuit being traced from (+) on conductor 14, make contact of relay SA, winding of relay YB, make contact and winding of relay YA to (−). This circuit is effective because the release of relay PB opens up the circuit extending by way of the lower break contact of relay YB to the winding of relay YA for removing the short circuit from the winding of relay YB, thus permitting the operation of this latter relay in series with the winding of relay YA. This operation of the XA, XB, YA and YB relays measures off a time interval after the primary or X magnet of the line finder has completed its operation and before the circuit is closed for operating the Y magnet of this finder, thus permitting the wipers of the finder to stop vibrating before entering the bank of the selected level.

The next operation of relay PB, after relay YB has been operated, closes a circuit for operating the secondary or Y magnet of the allotted finder extending from (+) on conductor 14, make contact of relay SA, make contact of relay PB, make contact of relay XB, make contact of relay YB, conductor 18, make contact of relay 1AL, conductor YM and winding of magnet Y to (−). When relay PB releases, this circuit to the line finder Y magnet is opened for effecting the release of this magnet, thus stopping the switch at the terminal in the level. Now when relay PB is next operated, the above mentioned circuit to the Y magnet is again closed for stepping the line finder to the second terminal in the level, after which relay PB is released. The finder is stepped to the third terminal in the level when relay PB again operates for closing the above described circuit to the Y magnet. Now when relay PB releases, the Y magnet is de-energized leaving the switch at the third terminal in the third level.

Referring back to the operation of relay YB of the allotter, a priming circuit is closed for Y stop relay YS to condition this relay for fast operation when the marked terminal is reached, for stopping the line finder Y stepping operation. This priming circuit may be traced from (+), make contact of relay YB, resistor 7RS and upper winding of relay YS to (−). When the line finder reaches the marked terminal a circuit is closed for operating relay YS of the allotter which may be traced from (+) on conductor 14, make contact of relay SA, lower winding of relay YS, make contact of relay YA, Y stop conductor YSP, break contact of relay SW of the line finder, make contact of relay ST, conductor 3, finder switch sleeve wiper FS and its associated terminal, make contact of relay LR of the line circuit, windings of relays CO and LO in series to (−). This circuit, in addition to operating relay YS, operates relays CO and LO of the line circuit. The operation of relay CO opens up and releases relay LR, but before this latter relay is released a locking circuit is closed for relays CO and LO including the lowermost make contact of relay CO, this contact bridging the make contact of relay LR.

The operation of relay YS of the allotter opens up the above described operating circuit to the PA and PB relays for stopping the operation of these pulsing relays. To prevent the premature release of relay PB, the operation of relay YS closes a locking circuit for relay PB which may be traced from (+), make contact of relay ST of the line finder, conductor PG, make contact of relay 1AL, break contact of relay LS, conductor 13, make contact of relay YS, make contact and winding of relay PB to (−). The operation of relay YS opens up the above described circuit for relay SA for effecting the release of this relay. The release of relay SA closes a circuit for operating relay SW of the line finder which may be traced from (+) coming back over sleeve conductor TS from a make contact of relay RD of the selector (the CB and RD relays of the selector being operated early in the cycle as will be later explained), break contact of magnet Z, make contact of relay ST, X and Y off normal contacts in multiple, lower winding of relay SW and winding of relay ST to (−). This circuit is effective because conductor 1FST is disconnected from (+) by the release of relay SA, thus removing the short circuit from the lower winding of relay SW and allowing this relay to operate in series with the winding of relay ST in a locking circuit for this latter relay previously described. With relays SW and ST of the line finder operated, (+) coming back over conductor TS from the selector is extended through make contacts of these two relays, conductor 3, wiper FS and terminal of the line finder for holding relays CO and LO of the line circuit. The release of relay SA disconnects conductor 14 from the windings of relays YS, XA, XB, YA and YB for effecting the release of these relays. During the short interval that relay YS was operated, a circuit was closed for operating peg count meter PC for counting this call. This circuit may be traced from (+), break contact of relay LS, conductor 17, make contact of relay YS and winding of meter PC to (−).

The operation of relay LO of the line finder opens up the circuit including conductor AST for effecting the release of relay ST in the event that there is no other call waiting. In the case of simultaneous calls, relay ST remains operated and when relays XA and XB release, relay SA can again operate. This operates relay ST of the next finder for running the circuits through another cycle in the same manner just described. The operation of relay SW of the line finder opens up conductor 1AL for opening up the above described locking circuit for relay 1AL for effecting the release of this relay. This allots the next link for the next call and relay 1AL cannot again operate until an allotting period is effected as will be later described. The circuit for operating the pulse generating relays PA and PG, including conductor PG, is opened by the release of relay 1AL so that the pulse generating relays will not be operated when relay YS releases to connect conductor 13 to these pulse generating relays.

It will now be explained how a so-called allotting period is effected for reconditioning the allotter relays 1AL–10AL of links which have become idle, this reconditioning being effective only when all links of the group have been used, i. e., full rotation of the links provided. It will be assumed that, previous to the release of relay 1AL as above described, all other AL relays associated with other finder links were released because of the use of these finder links. It will also be assumed that in the meantime links 2, 6 and 10 have become idle. It now becomes necessary to effect an allotting period operation for operating the AL relays associated with these idle links in order that these links may be used by succeeding calls. With all AL relays released, a series circuit is extended through the break contacts of all of these relays from (+) on the sixth spring combination from the top of relay 1AL, through similar break contacts of all other AL relays, including relay 10AL, conductor 19 and lower winding of relay RS to (−). This series circuit operates relay RS for closing a circuit for operating the AL relays of all idle links (2AL, 6AL and 10AL in this example), this circuit extending from (+), make contact and upper winding of relay RS, conductor 20, break contact of the 2, 6 and 10AL relays, the AL conductors associated with these relays, break contacts of the SW relays of the line finder associated with these idle links, break contacts of the X and Y off normal springs of these three idle links, the ALG conductors associated with these links and the lower windings of the AL relays over a circuit which is similar to that shown from conductor 1ALG leading to the lower winding of the 1AL relay. This operates the 2, 6 and 10AL relays and then a locking circuit is closed for these relays which includes the AL and ALG conductors and the lower windings of the associated AL relays to (−). When all of these AL relays have been operated, the above described locking circuit for relay RS, including its upper winding, is opened for effecting the slow release of relay RS. This marks the end of the allotting period and since the AL relays associated with idle links have been operated, these links may be taken for use in the previously described manner. While relay RS is in its operated position a tone is connected back to tone transformer TTF so that a calling party will receive this tone by way of the line circuit and the lower winding of the associated line relay to the upper winding of coil TTF until this allotting period is completed.

It will thus be seen that relay ST of the line finder associated with the first operated AL relay of the series (relay 1AL in this example) will operate in response to the calling line condition, after which this AL relay will release to mark the link busy and will remain released until all links have been used again. When all links have been used over agin, relay RS is again operated for re-setting all the AL relays that have been released because the associated link became busy and are now in condition to be reoperated because the associated link has become idle. This operation provides uniform allotting, i. e., when the allotter is advanced to a particular step in its operation, the clearing out of a link in the rear of this step will not effect the allotting of this link in response to another call, but the allotting operation will be forced to go through to link #10 (last link) before it can come back and use the earlier cleared link.

Figure 3:
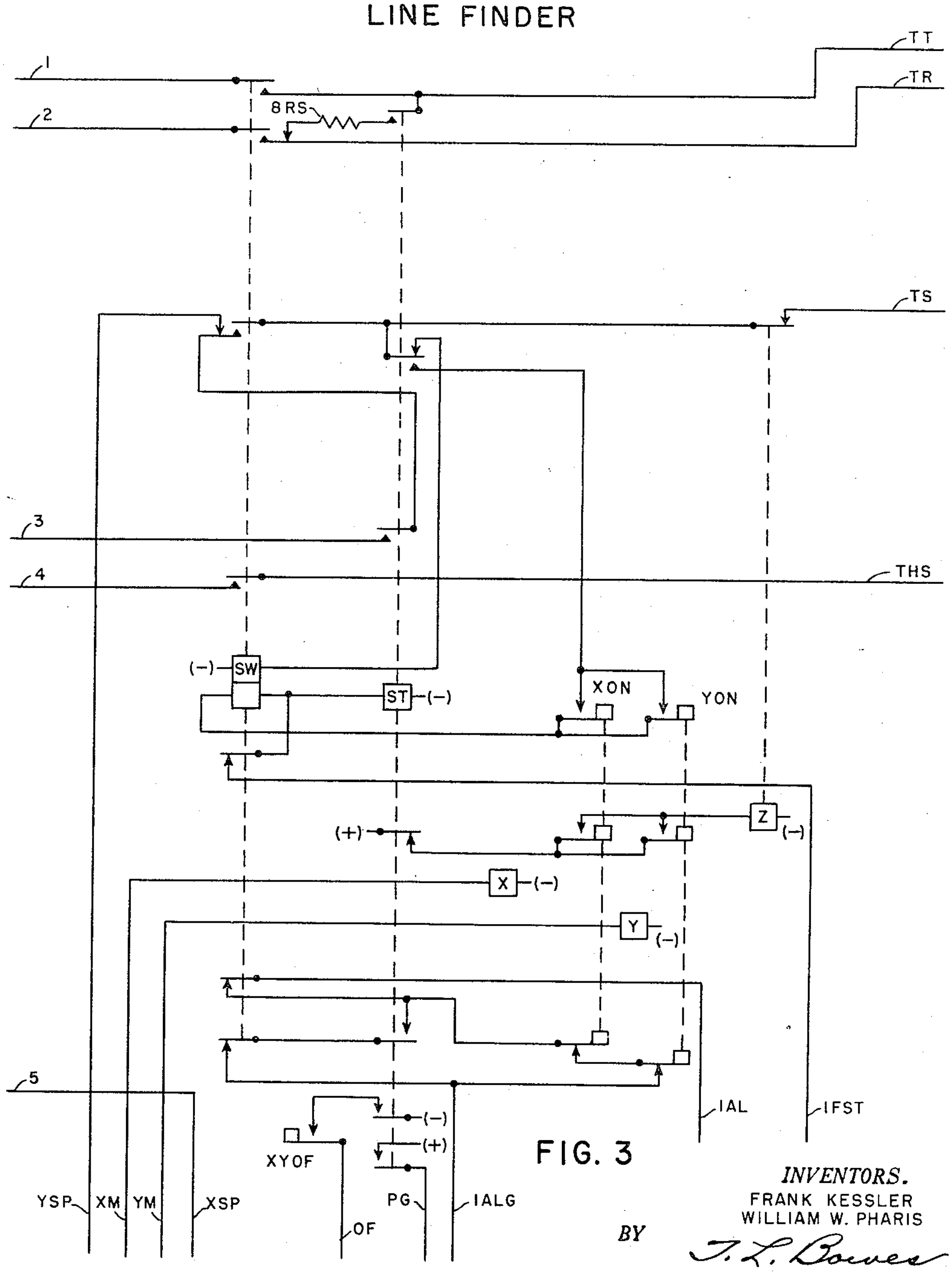
Fig. 3 shows the remaining portion of the above mentioned line finder.
Figure 4:
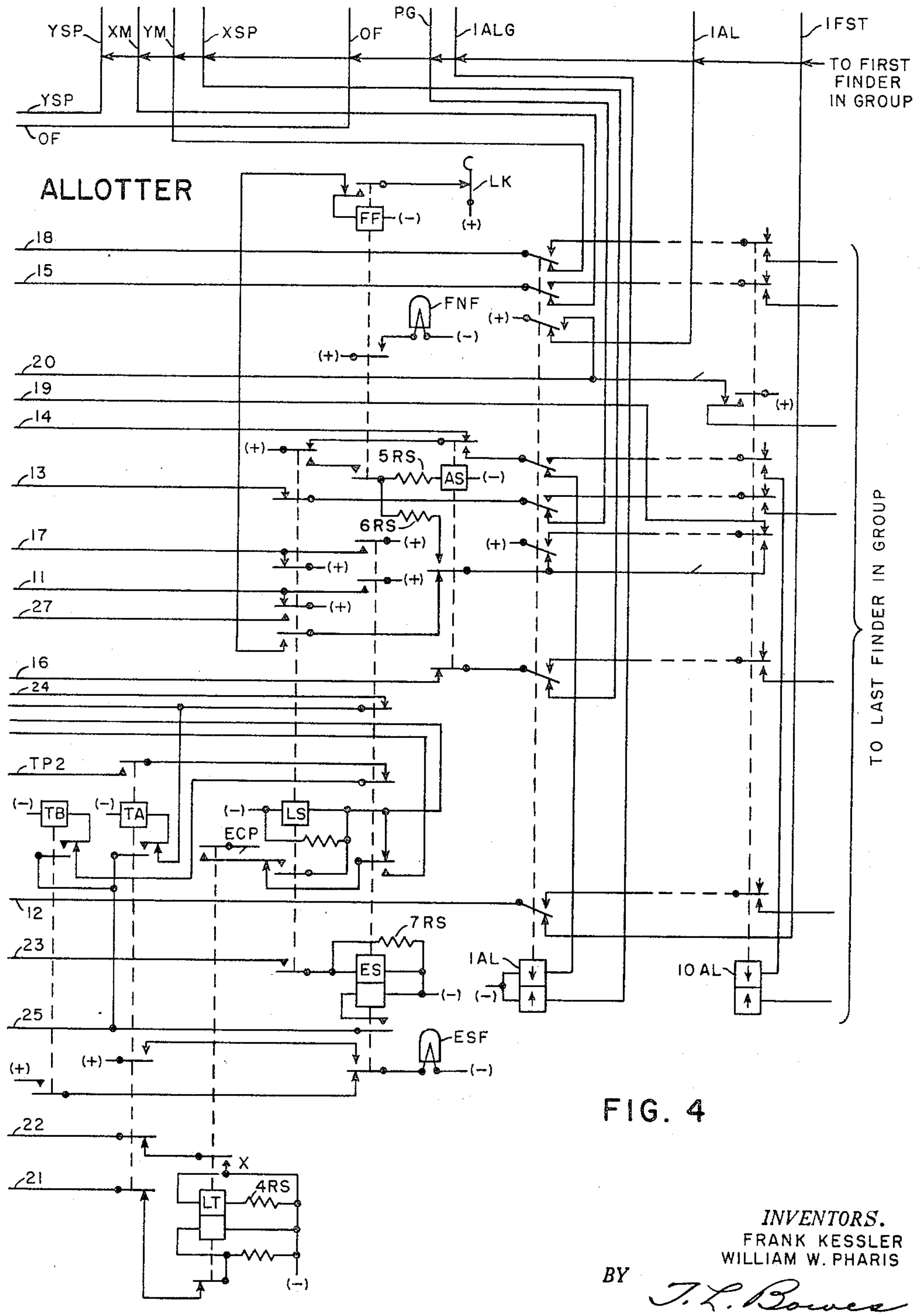

In the event that the finder switch fails to stop on the marked level or on the marked contact in the level, it will advance to the overflow position for closing the overflow contacts illustrated in the lower portion of Fig. 3. This operation closes a circuit for operating relay YS in the allotter which may be traced from (+), break contacts in series of relays LS and AS, conductor 14, make contact of relay SA, lower winding of relay YS, resistor 17RS, conductor OF, make contact of the overflow springs XYOF and make contact of relay ST to (−), it being understood that springs XYOF are closed in either the X or the Y overflow position. Relay YS effects the release of relay SA, after which relays XA, XB, YA and YB and then YS are released, all in the previously described manner for clearing out the allotter circuits. The finder switch will be released because the circuit to relay ST of the line finder is opened when relay SA releases to disconnect (+) potential from conductors 12 and 1FST. The release circuit for the finder switch may be traced from (+), break contact of relay ST, X or Y off normal contacts and winding of release magnet Z to (−).

The time release feature of the allotter will now be explained. In the event that the calling line is not found and the allotter circuit cleared out within a predetermined time interval, in the previously described manner, the circuits will be automatically released by an impulse applied to the "end of code pulse" conductor ECP approximately 8 seconds after a preliminary pickup pulse is applied to pickup conductor PU. It will be observed that the pulse on conductor PU may occur at any time during the operating cycle of the allotter for extending this pulse through a make contact of relay SA, conductor 21, break contact of relay TA, break contact and lower winding of relay LT to (−) for operating this latter relay. Relay LT is locked operated over a circuit extending from (+), make contact of relay SA, conductor 22, break contact of relay TA, make contact and upper winding of relay LT and resistor 4RS to (−). It will now be assumed that the circuits are not cleared out during the 8 seconds following the pickup pulse, so that the pulse on conductor ECP is effective to close a circuit for operating relay LS which may be traced from conductor ECP, make contact of relay LT, break contact of relay LS, break contact of relay ES and winding of relay LS to (−). Relay LS bypasses the circuit through the contacts of the relay by way of the inner lower make contact of relay LS to its winding for locking this relay operated by the pulse on conductor ECP, it being understood that relay LS is released at the end of the impulse period on conductor ECP.

A circuit is now closed for operating finder failure relay FF which may be traced from (+), make contact of relay 1AL, break contact of relay AS, make contact of relay LS, break contact and winding of relay FF to (−). Relay FF closes a locking circuit for itself extending from (+), break contact of locking key LK, make contact and winding of relay FF to (−). Relay FF closes an obvious circuit for lighting lamp FNF as an indication to the attendant that some finder failed in its operation. This relay and lamp are maintained energized until manually released by the momentary operation of key LK. The operation of relay LS also stops the pulse generating relays by opening up conductor 13. Relay AS is also operated over a circuit extending from (+), make contact of relay LS, make contact of relay FF, resistor 5RS and winding of relay AS to (−). This relay locks itself operated over a circuit extending from (+), make contact of relay 1AL, make contact of relay AS, resistor 6RS, resistor 5RS and winding of relay AS to (−). The operation of relay LS also effects the release of relay SA by de-energizing conductors 11 and 17. Relay SA is slightly slow to release because its winding is bridged by resistor 2RS and after this relay releases a circuit is closed for operating relay ES extending from (+), break contact of relay SA, conductor 23, make contact of relay LS and upper winding of relay ES to (−). Relay ES closes a locking circuit for itself extending from (+), make contact of relay ST, conductor 25, make contact and lower winding of relay ES to (−). The release of relay SA opens up the above described operating and locking circuits for relay LT for effecting the release of this relay.

The finder is released because relay SA, in releasing, disconnects (+) potential from conductors 12 and 1FST for effecting the release of the ST relay of the finder which in turn releases the finder switch in the previously described manner. Relay 1AL is released because its lower winding, including conductor 1ALG, is opened by the release of relay ST and not closed again until the switch reaches normal for closing the normal contacts of the XON and YON spring combinations. As an additional check on the release of relay 1AL, the release of relay LS opens up the circuit of relay AS, but this relay is locked operated by way of resistor 6RS if the 1AL relay does not release. Consequently, the upper winding of relay 1AL is energized over a circuit extending from (+), break contact of relay LS, make contact of relay AS, make contact and upper winding of relay 1AL to (−). Since this energization of the upper winding of relay 1AL opposes that of its lower winding, the 1AL relay is kicked down. The SA relay is now operated by way of conductor 11 to (+) at a break contact of the LS relay. The ES relay is not released because of the previously described circuit through its lower winding by way of conductor 25. Relay ES remains operated until the call is cleared out by the next finder allotted and the ST relay is released, because relay LS will be released at this time.

If the allotter relay ST remains operated for an exceedingly long period of time, due to the fact that the second allotted link in the above example fails to clear out the allotter circuit, pulses on conductors TP1 and TP2 are effective to bring in an emergency start finder alarm lamp ESF as will now be described. With relay ST operated, a pulse on common pulse conductor TP1 operates relay TA by way of conductor 24 and this relay locks operated over a circuit extending from (+), make contact of relay ST, conductor 25, make contact and winding of relay TA to (−). The operation of relay TA opens up and releases relay LT, if operated at this time. After a comparatively long interval of time, a pulse is applied to conductor TP2 and, if relay ST has not been released for releasing relay TA, a circuit is extended from conductor TP2, make contact of relay TA, break contact of relay ES, break contact and winding of relay TB to (−) for operating this latter relay. Relay TB locks operated to (+) on conductor 25. Relay TB remains locked as long as the ST relay is operated and lamp ESF is energized over a circuit extending from (+), make contact of relay TB (or TA), break (or make) contact of relay ESF and lamp ESF to (−). It will be understood that the circuit of lamp ES may control a major alarm for indicating to a distant operator that there is a major trouble condition in this remote dial office.

It will now be explained how relays CB and RD of the selector are operated. Referring back to the time that relay ST of the line finder was operated, a pre-impulse is applied to the line conductors TT and TR leading to the selector for operating relay CB of this switch. This circuit may be traced from (+), break contact of the X and Y overflow spring combination of the selector (Fig. 5) 2XYOF, break of relay XD, upper winding of relay CB, break contact of relay SW, conductor TT, make contact of relay ST, resistor 8RS, break contact of relay SW of the finder, conductor TR, break contact of relay SW of the selector and lower winding of relay CB to (−). The operation of relay CB closes a circuit for operating relay RD extending from (+), break contact of relay SW, make contact of relay CB and winding of relay RD to (−). By means of this pre-impulse circuit the CB and RD relays of the selector are operated well in advance of the association of the selector link with the calling line for providing the above mentioned control by (+) on conductor TS which is applied at the selector through a break contact of relay PT and make contact of relay RD to conductor TS. The operation of relay SW of the line finder substitutes the closed calling line circuit for the above mentioned pre-impulse circuit for holding the CB and RD relays of the selector in their operated positions.

Although the first selector and connector operations will later be described in detail, it will now be pointed out how the line and line finder circuits are released when the calling party terminates the connection. Hanging up the receiver at the calling station opens up the calling line circuit for releasing relay CB of the selector or the connector (if the call has progressed through to the connector), the release of relay CB of the selector or connector effects the release of the associated RD relay for removing (+) potential from the sleeve conductor, including conductor TS of Fig. 3. This opens up and releases relays SW and ST of the line finder, as well as releasing relays CO and LO of the line circuit because (+) is removed from conductor 3 extending back through line finder wiper FS to the calling line.

When relay LS of the allotter is operated in response to a finder failure condition, a circuit is closed for energizing the "all trunks busy" conductor ATB extending from (+), make contact of relay LS, conductor 27, make contact of relay RS and conductor ATB. Since this circuit is effective if relay LS is operated, the number of finder failure operations may be counted by a meter on conductor ATB.

It will be noted that there is a circuit normally extending from sleeve conductor TS of Fig. 3 to the upper winding of relay SW. This is for the purpose of making a finder-selector link busy by means of the usual test jack arrangement associated with the link. This is accomplished by applying (+) potential to conductor TS at the test jack for energizing and operating relay SW. The operation of relay SW disconnects the associated AL and ALG conductors for effecting the release of the AL relay associated with this link. This makes the link busy in the manner previously pointed out.

*Selector operation*

Figure 5:
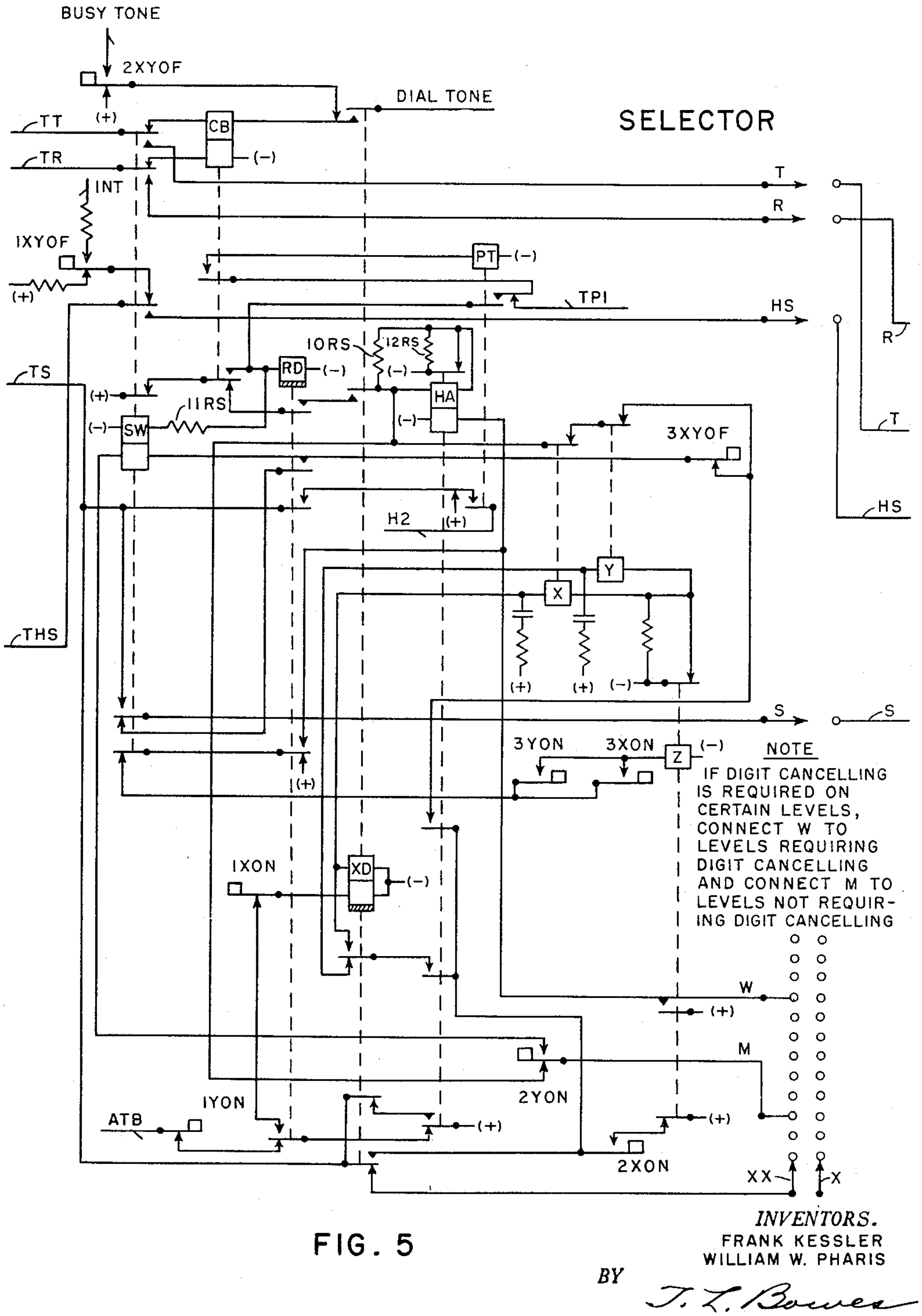
Fig. 5 shows the apparatus and circuits of the selector associated with the above mentioned line finder to make up one link circuit.
Figure 6:
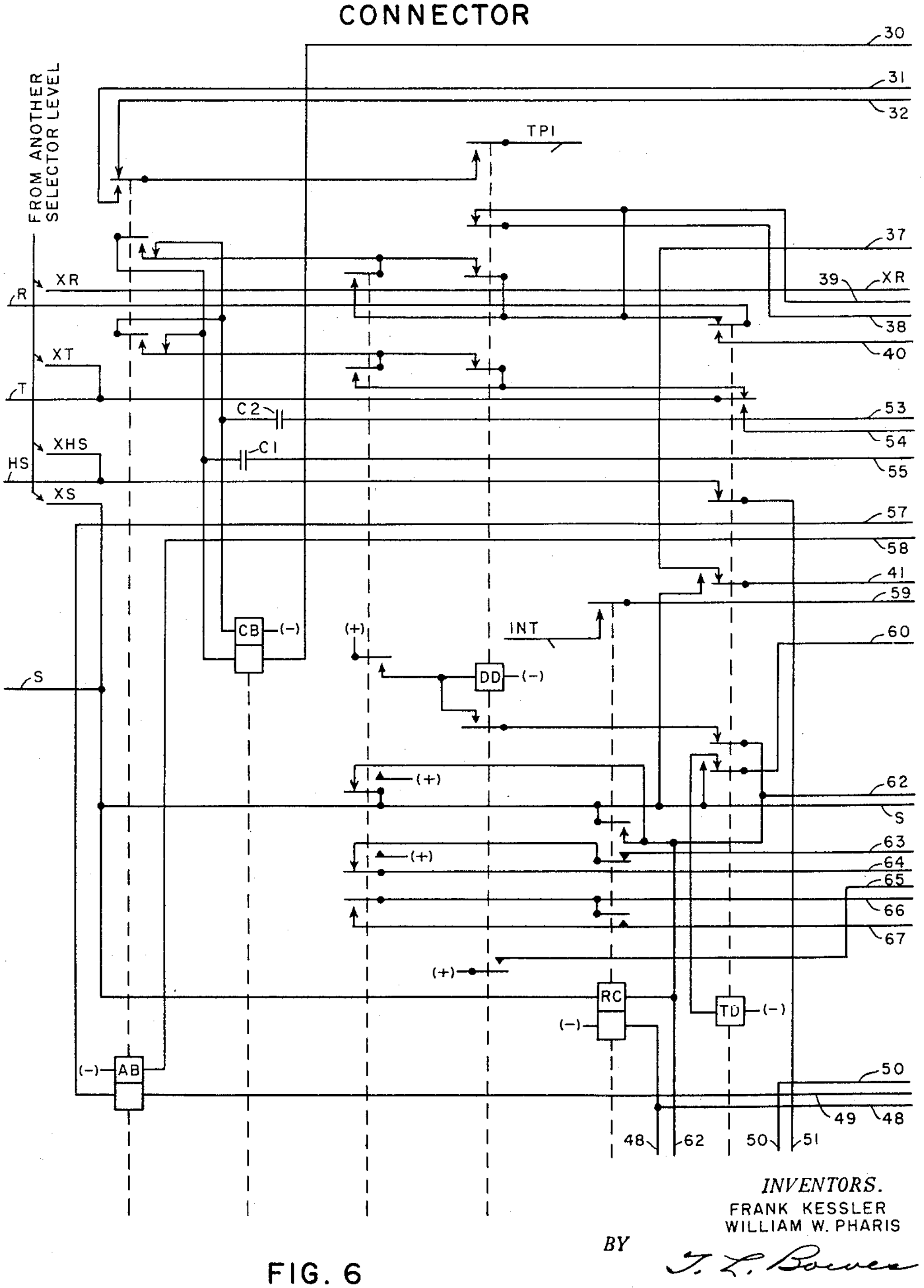
Figures 7, 14:
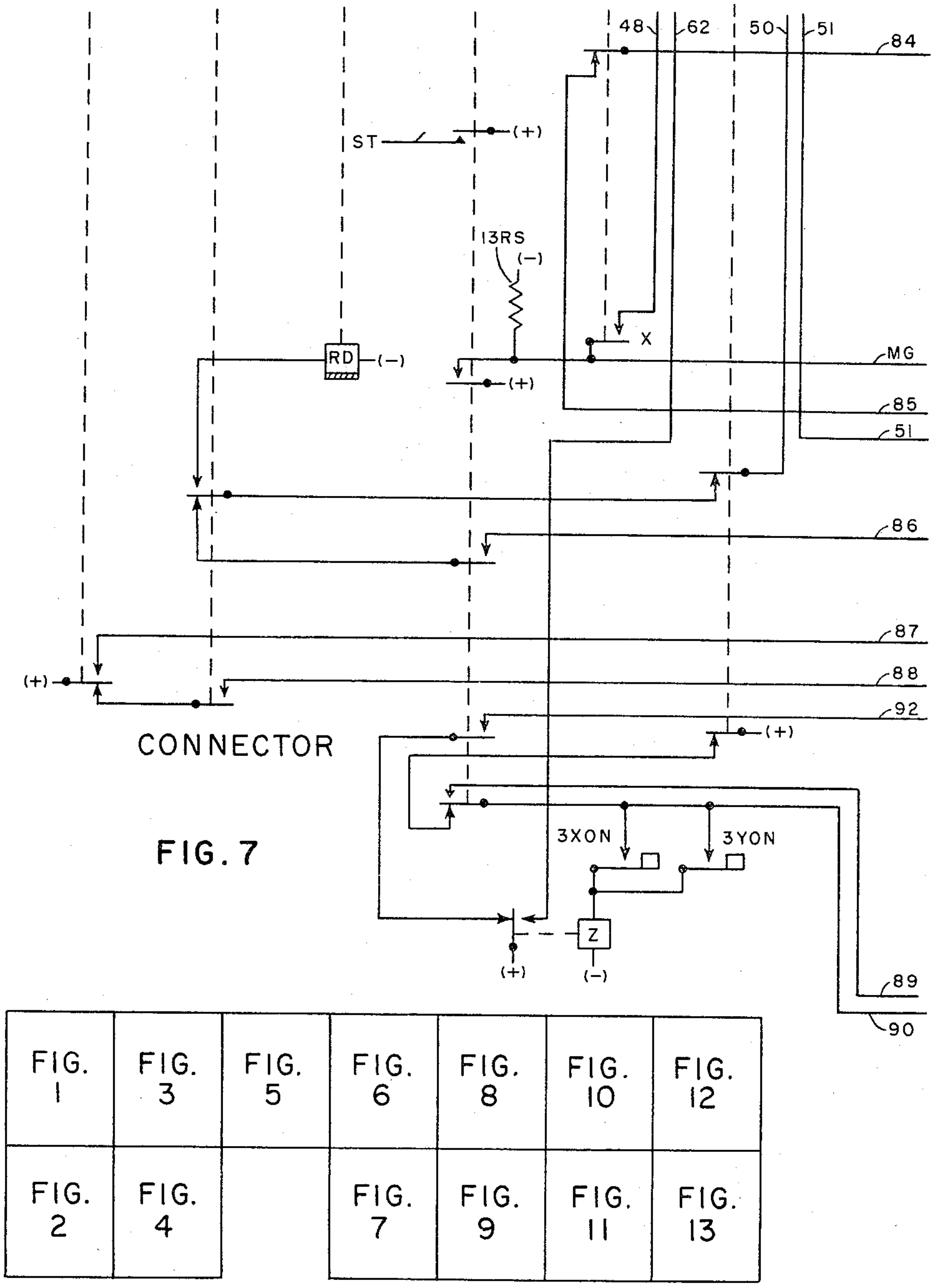
Fig. 14 is a block diagram showing how the other figures should be put together (with correspondingly numbered lines in alignment) for convenience in explaining the various operations.

The operation of the selector shown in Fig. 5 will now be explained. When the calling line is extended to conductors TT and TR leading to the selector, by the operation of relay SW of the finder, relay CB is held operated over the previously described circuit. Relay CB closes a circuit for operating relay RD extending from (+), break contact of relay SW, make contact of relay CB and winding of relay RD to (—). A circuit is now closed for operating relay XD extending from (+), break contact of relay HA, make contact of relay RD, break contact of X off normal spring combination 1XON and lower winding of relay XD to (—). The operation of relay XD switches, at its uppermost continuity spring combination, the tip side of the calling line from (+) to the common dial tone circuit, it being understood that the common dial tone conductor extends through a dial tone transformer or the like to (+). Relay SW of the selector is primed by the operation of relay RD closing a circuit from (+), break contact of relay SW, make contact of relay CB, resistor 11RS and upper winding of relay SW to (—), this priming circuit being for the purpose of rendering relay SW fast operating when the switch through circuit is completed as will be later described. Relay RD also applies (+) to sleeve conductor TS for holding relays ST and SW of the line finder and for extending this (+) back over conductor 3 for holding the cut off and lockout relays of the line circuit. This circuit was previously traced.

It will now be assumed that the calling party dials 2 for the first digit, resulting in the transmission of two impulses by the release of relay CB once for each impulse transmitted, after which this relay remains energized. The first release of relay CB closes a circuit for operating pulse assist relay HA extending from (+), break contact of relay SW of the selector, break contact of relay CB, make contact of relay RD, make contact of relay XD, upper winding of relay HA and its break contact to (—). The operation of relay HA is extremely fast because the circuit is to direct (—) at its break contact. After the operation of relay HA, this direct (—) is removed and the relay must then remain operated in series with resistor 12RS, thus rendering the relay fast to release because of the reduced holding current provided by the insertion of resistor 12RS. The operation of relay HA closes a locking circuit for itself extending from (+), break contact of relay PT, make contact of relay RD, make contact of relay XD, make contact of relay HA, break contacts in series of magnets X and Y, upper winding of relay HA and resistor 12RS to (—). This (+) also operates magnet X over a circuit extending through another make contact of relay HA and make contact of relay XD through the winding of magnet X to (—) at a break contact of release magnet Z. The operation of magnet X opens up its break contact for de-energizing the upper winding of relay HA, thus making the continued operation of this relay dependent upon the pulse provided at the break contact of relay CB. It will thus be seen that relay HA provides the pulse for operating magnet X and also locks itself in its operated position until magnet X actually operates. When relay CB energizes at the termination of the impulse, relay HA is released and the circuit to magnet X is opened for effecting the release of this magnet, thus the switch is stepped to its first level. The operation of relay CB at the end of the first impulse opens up the previously described operating circuit of relay HA so that this relay is released for de-energizing magnet X.

When relay CB releases to mark the beginning of the second impulse, relay HA is operated and locked as before and magnet X is operated for opening up the locking circuit of relay HA. When relay CB operates to mark the end of the second impulse, relay HA releases for effecting the release of magnet X, thus the switch is advanced to the second level. Since it is assumed that only two impulses are transmitted for this digit, relay XD will now be released as an indication that selection of the idle terminal in the selected level is to be effected. Although the stepping of the selector switch away from its normal position opens up the lower winding of relay XD, this relay is maintained in its energized position during the transmission of impulses by means of a circuit including its upper winding which is connected in multiple with magnet X, it being understood that relay XD remains operated during impulsing because of its slow acting characteristics. When relay XD releases at the end of the impulse transmission, the dial tone common is disconnected from the calling line and the line circuit is reconnected to (+) at the overflow contact 2XYOF.

The release of relay XD closes a circuit for operating relay HA extending from (+), break contact of relay PT, make contact of relay RD, break contact of relay XD, XX wiper and associated terminal, conductor M, contact 2YON in its normal position, upper winding of relay HA and its break contact to (—). Relay HA is locked by way of a circuit extending from (+), break contact of magnet Z, contact 2XON, make contact of relay HA, break contacts in series of magnets Y and X, upper winding of relay HA and resistor 12RS to (—). The Y magnet is now operated over a circuit extending from this same (+) and another make contact of relay HA, break contact of relay XD, winding of magnet Y and break contact of magnet Z to (—). The operation of magnet Y opens up the above described locking circuit for relay HA for effecting the release of this relay, which in turn opens up the above described circuit to magnet Y for de-energizing this magnet with the switch wipers on the first terminal of the level.

It will be assumed that the first trunk in this level is busy in order to indicate how the test circuit functions. A busy trunk will have (+) potential on the terminal to which wiper S of the selector is connected. This (+) potential is now extended over wiper S, break contact of relay SW, make contact of relay RD, overflow contact 3XYOF, break contacts in series of magnets Y and X, upper winding of relay HA and its break contact to (—). Relay HA again operates and closes its above described locking circuit and the above described operating circuit for magnet Y for causing the switch to advance to the second terminal in the selected level, after which magnet Y and relay HA are de-energized as before for leaving the switch wipers in connection with the second terminal. It will be assumed that this trunk is idle. A circuit is now closed for operating relay SW of the selector extending from (+), break contact of relay PT, make contact of relay RD, break contact of relay XD, wiper XX and its associated terminal, conductor M, contact 2YON, lower winding of relay SW, contact 3XYOF, break contacts in series of magnets Y and X, upper winding of relay HA and its break contact to (—). Relay HA is marginal in its operation and will not operate in series with the lower winding of relay SW but the latter relay quickly operates because of the above described circuit and because of the previously described priming circuit for this relay. It will be observed that, as long as wiper S of the selector tests busy terminals, (+) will be extended back over this wiper, break contact of relay SW and make contact of relay RD to the right hand terminal of the lower winding of relay SW for short circuiting this winding for preventing the operation of the SW relay until an idle trunk is reached.

Relay SW is maintained operated and conductor TS extending back to the finder is energized by means of the previously described circuit to (+) through a break contact of relay PT and a make contact of relay RD until this latter relay releases, which is shortly after relay SW operates and opens up the circuit to the winding of relay RD. Before relay RD releases, (+) comes back over conductor S from the switch ahead for locking relay SW operated by a substitute (+) in place of the circuit to (+) which is opened by the release of relay RD, this locking circuit for relay SW extending by way of its own make contact. The operation of relay SW opens up and releases relay CB, and as previously mentioned, before relay RD of the selector releases the CB and RD relays of the switch ahead are energized by means of the closed circuit across the calling line extended to the switch ahead by way of make contacts of relay SW and selector wipers T and R. This (+) coming back over conductor S from the switch ahead, in addition to locking relay SW of the selector, is extended back by way of conductor TS for holding the finder and line circuit relays which are operated.

When the connection is released, relays CB and RD of the switch ahead will be released in a manner to be later described, thus removing (+) from terminal and wiper S of the selector for opening up and releasing relay SW. A circuit is now closed for operating release magnet Z of this switch which may be traced from (+), break contact of relay RD, break contact of relay SW, X and Y off normal spring combinations in parallel and winding of magnet Z to (−). When the Z magnet operates, a circuit is closed for operating relay HA which may be traced from (+), make contact of magnet Z and lower winding of relay HA to (−). The operation of relay HA in the selector at this time performs no function. When the switch reaches its normal position the circuit to magnet Z is opened by contacts 3XON and 3YON for releasing this magnet and restoring the circuits to normal ready for another call. The removal of (+) from conductor TS releases relays SW and ST of the line finder for closing a circuit which operates release magnet Z of the line finder, extending from (+), break contact of relay ST, X and Y off normal springs in multiple and winding of magnet Z to (−). When the switch reaches normal, this circuit is opened by the off normal springs for effecting the release of magnet Z and the restoration of the circuit to normal.

It will now be explained how the selector operates when a number is dialed for the first digit which is to be cancelled. In this example it will be assumed that the first digit dialed is 8. When the selector is seized, relays CB, RD and XD operate and dial tone is applied to the calling line in the previously described manner. When relay CB responds to the impulses of the first digit, relay HA is operated, locked and magnet X is energized for advancing the selector to the eighth level, at which point relays HA and XD are released in the previously described manner. A circuit is now closed for operating relay HA extending from (+), break contact of relay PT, make contact of relay RD, break contact of relay XD, XX wiper and its 8th level terminal, conductor W and lower winding of relay HA to (−). This circuit from conductor W also extends through make contact of relay RD, break contact of relay SW and off normal contacts 3YON and 3XON to release magnet Z. Magnet Z operates and locks at its lower, inner make contact and releases the switch. When the switch reaches normal, magnet Z is opened for opening the circuit to the lower winding of relay HA and restoring the circuits to the same condition as when the selector was first seized. It will be understood that conductor W can be jumpered to any other terminal of the XX bank for digit cancelling on any other level.

It will now be explained how the time release feature of the selector operates. With relay CB operated, common pulse conductor TP1 is extended through a break contact of relay PT and a make contact of relay CB to the winding of relay PT. When a short pulse is applied to conductor TP1, with the selector seized and not switched through, relay PT is operated and locked to (+) by way of a make contact of relay CB and a break contact of relay SW. The operation of relay PT switches the holding circuit for conductor TS from (+) to common hold conductor H2. Conductor H2 is connected to (+) at the time conductor TP1 is pulsed and for an appreciable time interval after the pulse on conductor TP1. If the selector is operated and switched through during this appreciable time interval, the connection is not released because the control (+) potential then comes back over conductor S and wiper S from the switch ahead. However, if the selector is not operated and switched through within this appreciable time interval, (+) potential is removed from common conductor H2 for de-energizing conductor TS and releasing the finder and line circuits. The release of the line circuit causes this particular line circuit to go to its locked out condition in the previously described manner. The disconnection of the line circuit from the CB relay of the selector, by the release of the SW relay of the finder, effects the release of relays CB and RD of the selector for releasing this switch by means of a circuit extending from (+), break contact of relay RD, break contact of relay SW, off normal contacts 3YON or 3XON and winding of magnet Z to (−). This restores the selector switch to normal ready for seizure by another call. The release of the selector from a completed connection is controlled by the removal of (+) from sleeve conductor S and wiper S for de-energizing conductor TS, which effects the release of the finder and line circuits. The de-energization of conductor S also opens up the locking circuit for relay SW of the selector for closing the above described release circuit for magnet Z of the selector switch, thus restoring the selector circuit to normal.

*Connector operation*

The connector of this system is of the universal type, that is, it will operate in a connector type system or a selector type system to provide the various features pointed out in the specification.

The terminals and reference characters, explained below, shown in the right hand portion of Figs. 12 and 13 and in the upper left hand portion of Fig. 11 are used to provide the various features required in the system when the connector is operating in a system which does not have selectors. In the present disclosure, a selector has been shown and described and the detailed operation of the connector will be described as operating in a system using selector switches. It will now be pointed out how the terminals shown in the right hand portion of Figs. 12 and 13 are connected when the connector shown in Figs. 6–13 operates in a connector type system, it being understood that none of the terminals A, B, C, D, G nor the XX bank, shown in the right hand portion of Fig. 12 are used in a selector type system.

When operating in a connector type system (no selectors), terminal A is connected to the XX bank level where the first digit causes codes 1–10 to be rung on a called line.

When operating in a connector type system, terminal B is connected to the XX bank level where the first digit selects codes 11–20 for ringing on a called line.

When operating in a connector type system, terminal C is connected to the XX bank of the "switching through"

level when the connector operates on a particular level (usually 0) to provide the "switching through" feature.

When operating in a connector type system, terminal D is connected to the XX bank of the "switching through" level (usually 0) for restricting restricted lines (such restricted lines having (+) connected on the HS lead of these lines) from this level.

Terminal G is connected to terminal G1 (lower right hand portion of Fig. 12) when the connector is used in a connector type system.

Terminal H is connected to terminal H1 (upper left hand portion of Fig. 11) when the connector is used in a selector type system.

Terminal RV is connected to terminals 6–0 of the DE wiper of the minor switch for controlling ringing on the ring side of the line for last digits 1–5 and on the tip side of the line for last digits 6–0.

Terminal RV is connected to terminals 2, 4, 6, 8 and 0 of the DE wiper of the minor switch so that connection with odd terminals rings over the ring side of the line and with even terminals rings over the tip side of the line.

Figure 8:
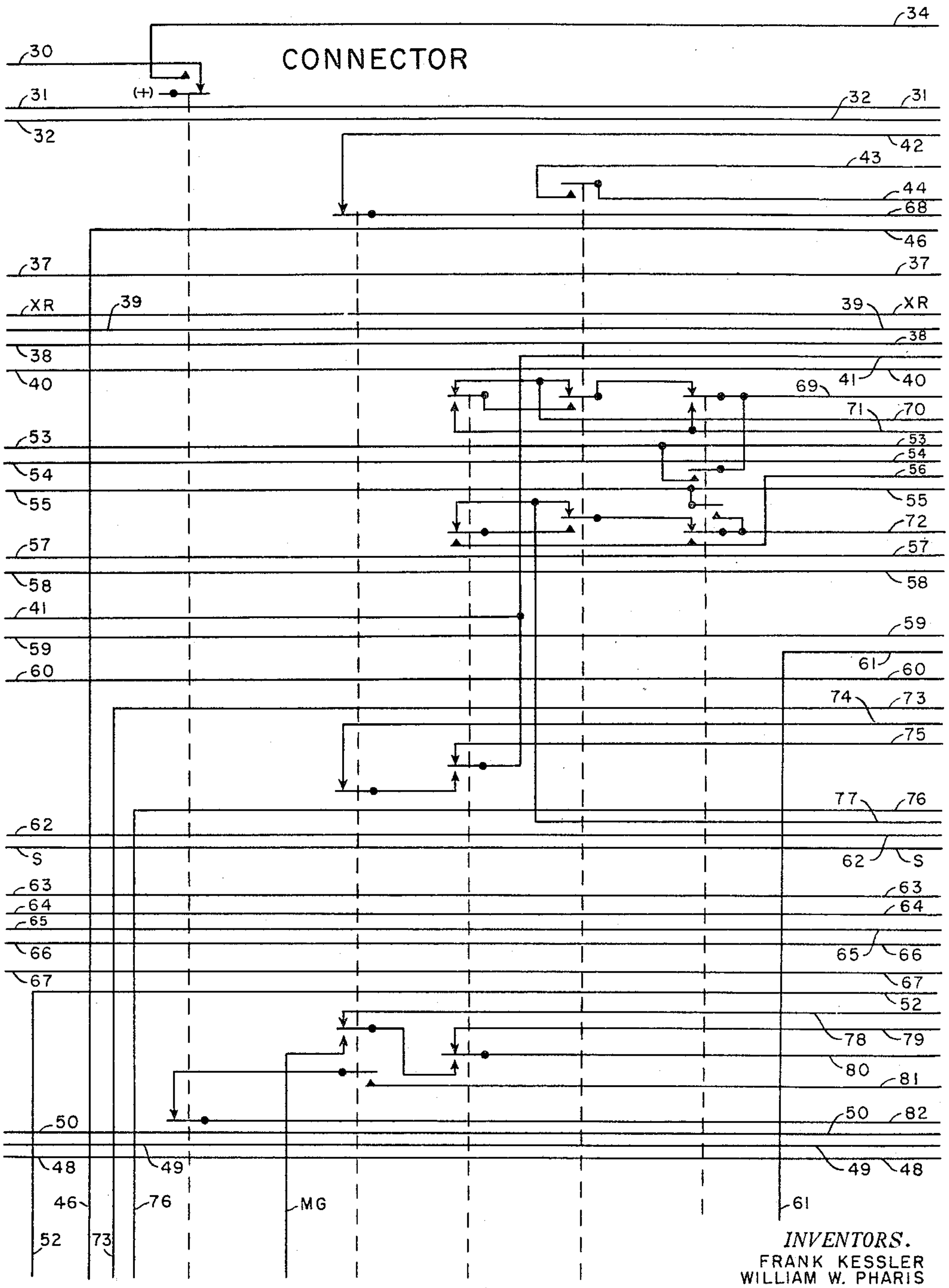
Figure 9:
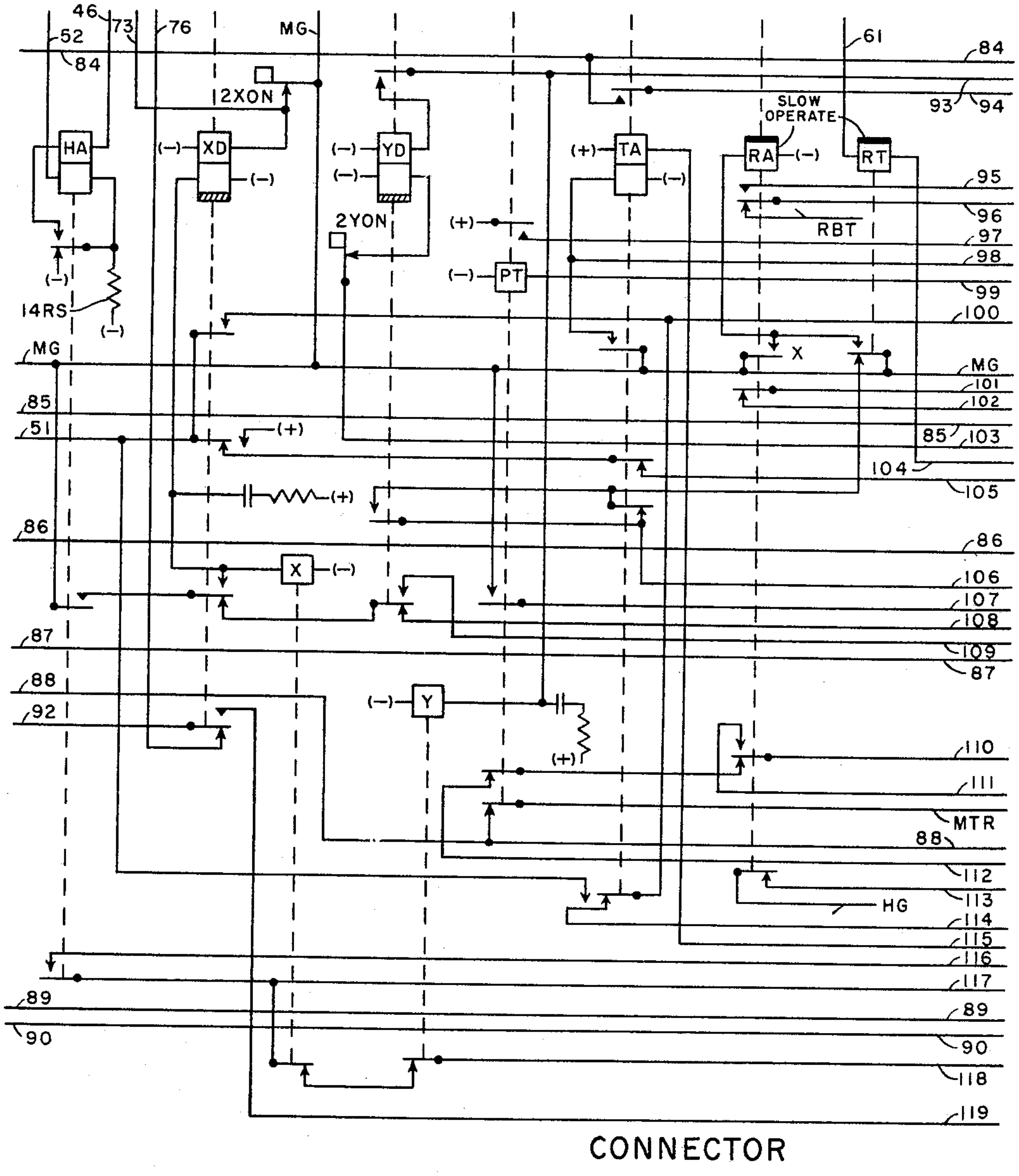
Figure 10:
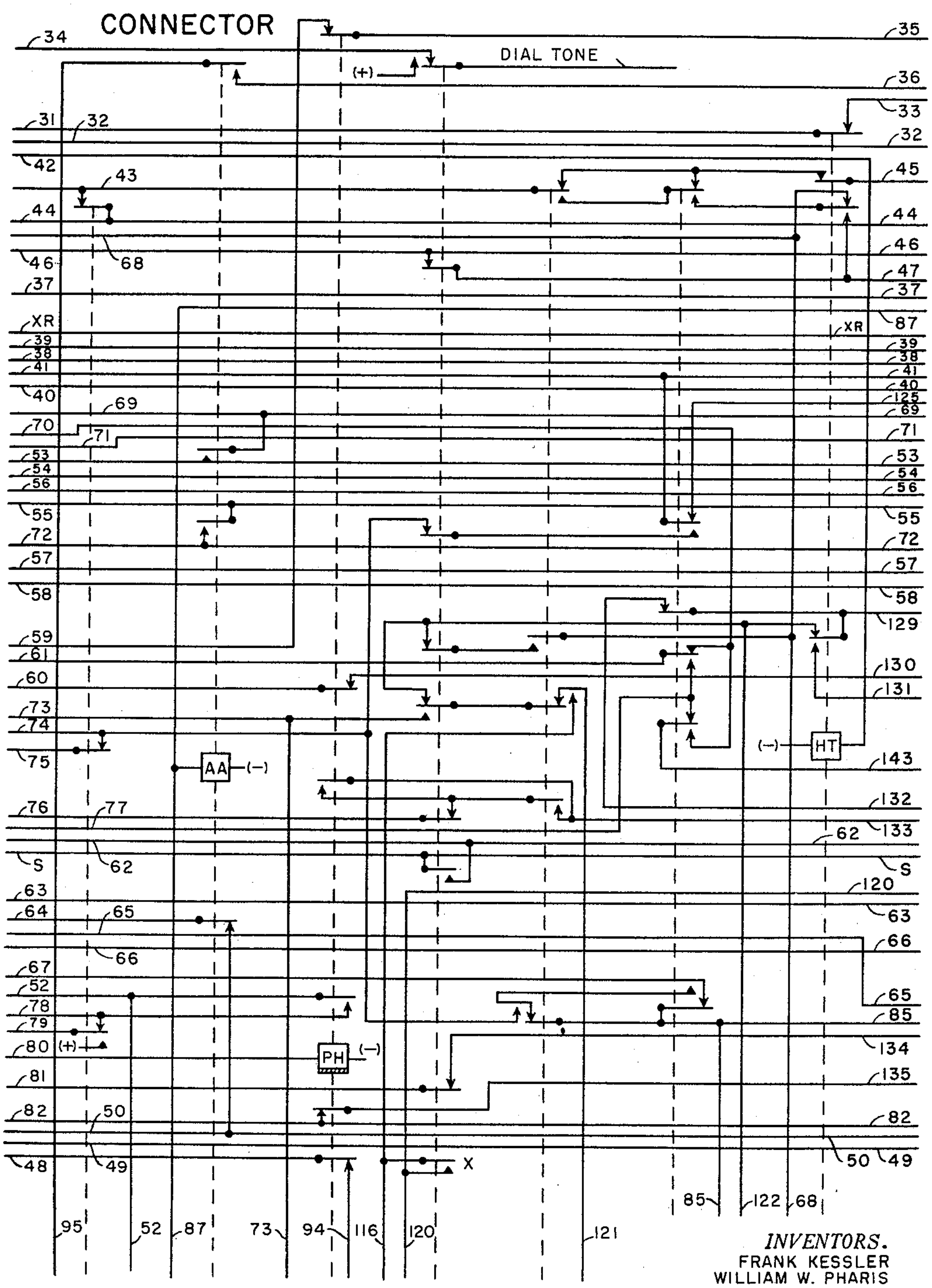

When the connector is seized by the selector, as previously described, the closed circuit across the calling line extended through the tip and ring wipers T and R of the selector operate relay CB of the connector over a circuit extending from (+), break contact of relay XD of Fig. 8, conductor 30, lower winding of relay CB, break contact of relay AB, break contact of relay DD, break contact of relay TD, conductor T, over the line and substation circuits in series, conductor R, break contact of relay TD, break contact of relay DD, break contact of relay AB and upper winding of relay CB to (−). The operation of relay CB closes a circuit for operating relay RD extending from (+), break contact of relay CA, conductor 50, break contact of relay TD, make contact of relay CB and winding of relay RD to (−). The operation of relay CB also lights the monitor lamp connected to conductor MTR, this circuit extending from (+), break contact of relay AB, make contact of relay CB, conductor 88, break contact of relay PT and common conductor MTR to the monitor lamp connected to this conductor.

When the connector is seized, the incoming HS conductor is extended to (+) through the upper winding of relay TA for making a test to determine whether or not this relay should be operated, the circuit extending from (+), upper winding of relay TA, conductor 115, break contact of relay AA, conductor 114, break contact of relay TA, conductor 100, break contact of X off-normal contact 1XON, break contact of Y off-normal contact 1YON, conductor 105, break contact of relay TA, break contact of relay XD, conductor 51 and break contact of relay TD to conductor HS. It will be assumed that this is a local call (not a toll call), therefore the HS conductor incoming to the connector has no potential connected thereto, consequently relay TA is not operated.

The operation of relay RD closes a circuit for operating relay DD extending from (+), make contact of relay RD and winding of relay DD to (−). Relay DD closes a locking circuit for itself extending from (+), make contact of relay RD, break contact of relay TD, make contact and winding of relay DD to (−). The operation of relay DD connects (+) to master ground conductor MG, this energized conductor being used for controlling certain locking and releasing circuits as will be later described. Since relay DD is maintained operated as long as the connector is in use, it applies (+) to common start conductor ST for operating the necessary common apparatus.

Resistor 13RS is connected between the master ground conductor and (−) for spark absorbing purposes when the master ground conductor is de-energized by the release of relay DD. The operation of relay RD also applied (+) potential to the incoming sleeve conductor S for making this connector busy and for holding purposes, this circuit being traced from (+), make contact of relay RD, make contact of relay DD, break contact of relay TD, conductor 62, break contact of relay BT and conductor S leading back to the preceding switch circuits. It will also be noted that this same circuit, including conductor 62, is connected to (+) at a make contact of relay RD, this for a purpose to be later described in connection with a reverting call.

Relay XD is now operated over a circuit extending from (+) on conductor MG, break contact of X off-normal combination 2XON and upper winding of relay XD to (−). In the event that this connector is used in a connector type system (no selectors provided) the calling party will now receive dial tone over a circuit extending from the common dial tone conductor, uppermost break contact of relay DC, conductor 34, make contact of relay XD, conductor 30, lower winding of relay CB and over the calling line circuit previously described. The operation of relay XD short circuits the upper winding of relay TA and connecsts direct (+) to incoming conductor HS to prevent the operation of relay TA at this time, this circuit being traced from (+), make contact of relay XD, break contact of relay TA, conductor 105, break contacts of the Y and X off-normal springs 1YON and 1XON, conductor 100, break contact of relay TA, conductor 114, break contact of relay AA and conductor 115 to the right hand terminal of the upper winding of relay TA. Relay YD is operated at this time over a circuit extending from (+) on conductor MG, break contact of relay DA, conductor 103, break contact of Y off-normal spring combination 2YON and lower winding of relay YD to (−). The circuit for energizing the upper winding of relay XD is extended by way of conductor 73, jumper H—H1 (used in a selector type system), conductor 97, break contact and lower winding of relay DA for energizing this relay. Relay DA operates and inserts the lower winding of relay DC in this circuit for operating relay DC. Relay PD is now operated over a circuit extending from (+), break contact of release magnet Z, make contact of relay DD, conductor 92, make contact of relay XD, conductor 119 and upper winding of relay PD to (−). Relay PD closes a first locking circuit for itself extending from (+) on conductor MG, make contact of relay DC, make contact of relay PD, break contact of the minor switch off-normal spring combination 2MON and upper winding of relay PD to (−). Relay PH is now operated over a circuit extending from (+), make contact of relay PD, conductor 79, break contact of relay PT, conductor 80 and winding of relay PH to (−). Relay DC is now locked over a circuit which may be traced from (+) on conductor MG, make contact of relay PH, conductor 116, X make contact (closed first) of relay DC, conductor 120 and upper winding of relay DC to (−). Relay DA is now locked over a circuit extending from the (+) on conductor 116, make contact of relay DA, conductor 121 and upper winding of relay DA to (−).

The circuits are now in condition for receiving the tens digit, it having been assumed that this digit is No. 2. Each release of relay CB in response to the two impulses transmitted opens up the above described circuit to conductor MTR for intermittently de-energizing this conductor for flashing the lamp as an indication that dialing is taking place. This connector circuit is provided with a lock pulse arrangement, including relay HA, consequently, this relay will be operated in response to each release of relay CB, will lock itself operated and will repeat the impulse to the stepping magnet, the operation of the stepping magnet opening the locking circuit for the HA relay, this latter relay being released only when its locking circuit is opened and when the CB relay operates at the end of the impulse. This arrangement is effective to cause a sufficiently long impulse to be delivered to the stepping magnet to fully operate this magnet, even though the received impulse is of such short duration that the magnet would not be operated, although the impulse is sufficiently long to operate a fast acting relay. Relay HA is made very fast to operate by connecting its lower (operating) winding to direct (−) by way of its own break contact. The relay is made fast to release because the operation of the relay opens up the circuit to direct (−) and inserts resistor 14RS in its winding for reducing the current through the operating winding.

The release of relay CB closes a circuit for operating relay HA which may be traced from (+), break contact of relay CA, conductor 50, break contact of relay TD, break contact of relay CB, make contact of relay DD, conductor 86, make contact of relay PD, conductor 52, lower winding of relay HA and its break contact to (−). Relay HA closes a locking circuit for itself extending from (+) on conductor MG, make contact of relay PH, conductor 116, make contact of relay HA, break contact of magnet X, break contact of magnet Y, conductor 118, break contact of magnet MX, conductor 52, lower winding of relay HA and resistor 14RS to (−). Relay HA closes an operating circuit for the primary stepping magnet X extending from (+) on conductor MG, make contact of relay HA, make contact of relay XD and winding of magnet X to (−). This circuit to magnet X extends to the lower winding of relay XD for holding this relay operated during stepping of the switch magnet. The XD relay does not release between impulses because of its slow acting characteristics. The operation of the X magnet opens up the above described locking circuit for the HA relay and this relay will now release when relay CB operates at the end of the impulse period for opening up the above described operating circuit for the HA relay. The release of relay HA opens up the above described operating circuit for magnet X for effecting the release of this magnet. At the beginning of the second impulse, the release of relay CB closes the above described circuit for relay HA, which operates, locks and again closes the operating circuit for the X magnet. After the operation of the X magnet, the locking circuit for relay HA is opened and when relay CB operates at the end of the impulse, the HA relay is released for effecting the release of magnet X, thus leaving the switch at the second level. Relay XD is held operated as before by the impulse transmitted to the X magnet, this relay being released after a time interval following the operation of relay CB. When the switch takes its first step in the primary direction a circuit is closed for operating relay RV which may be traced from (+), make contact of relay XD, break contact of relay TA, conductor 105, Y off-normal contact 1YON in its normal position, X off-normal contact 1XON in its operated position, break contact of relay SW, conductor 139 and winding of relay RV to (−). This circuit is opened for releasing relay RV when relay XD releases and disconnects (+) from conductor 105. The operation of relay RV at this time performs no function. When the switch takes its first primary step, direct (+) is removed from incoming conductor HS because contact 1XON is opened, thus connecting (+) through the upper winding of relay TA to conductor HS over a circuit which may now be traced from (+), upper winding of relay TA, conductor 115, break contact of relay AA, conductor 114, break contact of relay TA, make contact of relay XD, conductor 51 and break contact of relay TD to conductor HS. When relay XD releases at the end of the tens digit, conductor HS is switched to the winding of relay RV by way of a circuit which may be traced from conductor HS, break contact of relay TD, conductor 51, break contact of relay XD, break contact of relay TA, conductor 105, break contact of Y off-normal 1YON, make contact of X off-normal 1XON, break contact of relay SW, conductor 139 and relay RV. The function of this HS circuit will be explained later.

The two impulses of the units digit are effective to operate and lock the HA relay in the previously described manner, with the locking circuit controlled by the Y magnet this time because this locking circuit extends through the break contact of the Y magnet (previously described) and is opened at each step of this magnet. The operation of relay HA operates the Y magnet for causing the switch to step in its secondary direction by means of a circuit which may now be traced from (+) on conductor MG, make contact of relay HA, break contact of relay XD, make contact of relay YD, conductor 109, make contact of relay DC, conductor 93 and winding of Y magnet to (−). Each of these impulses closes a locking circuit for relay YD extending from conductor 93 and make contact of relay YD to its upper winding. Relay YD holds up between impulses because of its slow acting characteristics and at the end of the impulse transmission, it is released because the above described locking circuit to its upper winding is opened. When the switch takes its first secondary step, the HS conductor circuit is opened and remains open during the remainder of the connection. Relay RV is operated at this time over a circuit extending from (+), make contact of relay PH, conductor 140, make contact of off-normal 1YON, make contact of off-normal 1XON, break contact of relay SW, conductor 139 and winding of relay RV to (−). Conductor MG is connected to the locking circuit of the DA and DC relays, including conductor 116, by the operation of relay RV.

The station digit is next dialed and since it is assumed that this digit comprises two impulses, relay HA will be operated, locked and released twice in the previously described manner. The first operation of relay HA closes a circuit for operating the minor switch stepping magnet which may be traced from (+) on conductor MG, make contact of relay HA, break contact of relay XD, break contact of relay YD, conductor 108, make contact of relay DA, make contact of relay PH, break contact of relay HT, make contact of relay DC, make contact of relay PD, conductor 136 and magnet MX to (−). The lower winding of relay PD is connected in multiple with magnet MX for maintaining this relay energized during the transmission of the station digit. At the end of this digit, relay PD is released because no more impulses are applied to conductor 136 and because the first locking circuit previously described for the PD relay is opened at contact 2MON when the minor switch steps off normal.

This leaves the XY switch on the second terminal of the second level and leaves the minor switch associated with this XY switch on its second off-normal terminal. It is now necessary to test the called line for its busy or idle condition, it being first assumed that the called line is idle. The release of relay PD opens up conductor 86 so that any additional operation of the calling dial will be ineffective to repeat any impulses to the switch equipment. The release of relay PD also opens up and releases relay PH by disconnecting (+) from conductors 79 and 80. The release of relay PH opens up and releases relay RV by disconnecting (+) from conductor 140. The release of relay RV opens up and releases relays DA and DC by disconnecting master ground conductor MG from conductor 116. During the interval between the release of relay PD and the release of relay RV, the called S conductor is connected to busy test relay BT for operating this relay if the called line is busy. This circuit may be traced from the called line terminal to which wiper S of the connector switch is connected, wiper S, conductor 37, break contact of relay TD, conductor 41, break contact of relay PT, conductor 75, break contact of relay PD, make contact of relay DA, make contact of relay RV, conductor 67, make contact of relay RD, conductor 66 and winding of relay BT to (−). Since it is assumed that the called line is idle, there is no (+) potential on the terminal to which wiper S is connected, consequently relay BT does not operate.

Since the called line is idle, relay SW is now operated (when relay RV is released) over a circuit which may be traced from (+), make contact of relay RD, break contact of relay RC, conductor 63, upper winding of relay SW, conductor 125, break contact of relay RV, conductor 41, break contact of relay TD, conductor 37 and wiper S to the sleeve conductor of the called line. Since this sleeve conductor is connected to (—) through the winding of the cut off relay of the line circuit, the upper winding of relay SW is energized for operating this relay and it locks over a circuit extending from conductor MG, X contact and lower winding of relay SW to (—). The called sleeve conductor S is now connected to (+) for making the called line busy and for operating the cut off relay of this line over a circuit which may be traced from (+), make contact of relay RD, break contact of relay RC, conductor 63, make contact of relay SW, conductor 41, break contact of relay TD, conductor 37 and wiper S to the sleeve terminal of the called line.

It will now be explained how the called station bell is rung in accordance with the station selected by the last digit. Common pickup interrupter PU1 is pulsed at the beginning of the ringing cycle for operating pickup relay PU over a circuit which may now be traced from conductor PU1, break contact of relay CP, break contact of relay PU, conductor 112, break contact of relay PT, break contact of relay RA, conductor 110, make contact of relay SW and winding of relay PU to (—). Common hold conductor HG (lower right hand portion of Fig. 9) is connected to (+) at the time that pickup conductor PU1 is pulsed and is maintained connected to (+) throughout the ringing cycle. Consequently, a locking circuit is closed for relay PU extending from conductor HG, break contact of relay RA, conductor 113, make contact of relay PU, conductor 112, break contact of relay PT, break contact of relay RA, conductor 110, make contact of relay SW and winding of relay PU to (—). This maintains relay PU energized throughout the ringing cycle so that the called station is rung (in this example minor switch wipers on terminal No. 2) over a circuit which may be traced from the source of coded generator connected to the second terminal of the minor switch and its wiper GEN, make contact of relay PU, conductor 104, winding of ringing trip relay RT, conductor 61, break contact of relay RV (relay RV being de-energized because it is assumed that terminal RV is connected to the last five terminals of wiper DE of the minor switch, this minor switch standing on the second terminal at this time), conductor 70, break contact of relay TA, break contact of relay RA, conductor 69, make contact of relay SW, wiper R and its associated terminal, over the ring side of the called line and the substation circuit in series, over the tip side of the called line, terminal and wiper T, make contact of relay SW, conductor 72, break contact of relay RA, break contact of relay TA, conductor 77, break contact of relay RV, conductor 143, and break contact of relay BT to (+). It will be understood that other codes are selected for ringing over the ring side of the line in this same manner by selecting any one of the other first five terminals of the minor switch, these codes being provided by coding the common generator sources connected to the terminals of wiper GEN. It will also be understood that, when the minor switch is advanced to any one of the last five terminals, 6–0, the RV relay will be operated over a circuit extending from (+) on conductor MG, make contact of relay DC, break contact of relay PD, conductor 102, break contact of relay RA, conductor 101, wiper DE and its associated terminal, terminal RV, make contact of relay SW, conductor 139 and winding of relay RV to (—). The operation of relay RV reverses the above described connection to the generator and (+) terminals for ringing over the tip side of the line, thus providing coded and divided circuit ringing. It will be understood that relay PU is released at the end of the ringing cycle when its locking circuit is opened by the removal of (+) from conductor HG. In the event that the call is not answered before conductor PU1 is again energized to start the next ringing cycle, relay PU is again operated and locked throughout this next ringing cycle. During the ringing cycle, ring back tone is connected to the calling line as an indication that the called station is being rung. This circuit may be traced from the source of ring back tone RBT (upper right hand portion of Fig. 9), break contact of relay RA, conductor 96, make contact of relay PU, condenser C5, conductor 53, condenser C2, break contact of relay AB, make contact of relay RD, break contact of relay TD and over the ring side of the calling line to the calling station.

When the call is answered, the closed circuit across the called line operates relay RT, since this relay is included in the above described ringing circuit including conductor 104 and break contact of relay PU (released at the end of the ringing cycle), conductor 141 and break contact of relay AA to (—). The operation of relay RT closes a circuit for operating relay RA extending from (+) on conductor MG, make contact of relay RT and winding of relay RA to (—). Relay RA closes a locking circuit for itself extending from conductor MG, X make contact of relay RA and its winding to (—). The operation of relay RA opens up the above described circuit to relay PU, including conductor 110, and extends this conductor by way of conductor 111, make contact of relay AA, conductor 138, break contact of relay CT and make contact of relay CA to common conductor CWT, for a purpose which will be later described. This, of course, prevents any further operation of relay PU from the pickup conductor, thus discontinuing the ringing over the called line. The operation of relay RA opens up conductor 101 leading to the RV relay for effecting the release of this relay if the station digit is such that the RV relay is operated. The operation of relay RT disconnects conductor MG from the locking circuit (lower winding) of relay CA for effecting the release of this relay if it should be operated at this time due to the time release circuit operation later to be described.

The operation of relay RA disconnects the tip and ring called line circuit, including conductors 69 and 72, from the above described ringing circuit, including relay RT, for effecting the release of relay RT. Relay RA extends these conductors 69 and 72 by way of conductors 71 and 56, break contact of relay BT and make contact of relay SW to conductors 57 and 58 leading back to the AB relay, thus the closed circuit across the called line operates relay AB at this time, its upper winding being connected directly to (—) and its lower winding being connected to (+) by way of conductor 49 and make contact of relay SW. The operation of relay AB reverses the battery connection back to the calling station for supervisory or metering purposes and switches conductor TP1 from the upper winding of relay CA to the upper winding of relay CT, for time release purposes later to be described.

The operation of relay AB closes a circuit for operating relay AA which may be traced from (+), make contact of relay AB, conductor 87 and winding of relay AA to (—). The talking circuit is now complete, with battery being fed to the calling line by way of the windings of relay CB, and to the called line by way of the windings of relay AB and with these lines connected together by way of condensers C1 and C2 for providing an inductive conversational circuit.

When the called party hangs up the receiver, the above described circuit including the windings of relay AB is opened for effecting the release of this relay and the consequent release of relay AA. It will be noted that the monitor lamp conductor MTR is opened at the lowermost break contact of relay AB as long as the called party has the receiver off the hook. When this receiver is replaced, the release of relay AB again closes the circuit to the monitor lamp including conductor 88 and break contact of relay PT to provide a visual indication that the calling party is still on the line and the called party is not.

When the calling party hangs up the receiver, the opening of this line effects the release of relay CB for opening up and releasing relay RD, which in turn opens up and releases relay DD. The release of relay DD disconnects (+) from master ground conductor MG for opening up the locking circuits for the SW and RA relays for effecting the release of these relays. Since the sleeve wiper S is connected to (+) by way of conductor MG, the de-energization of this MG conductor de-energizes sleeve wiper S for restoring the sleeve circuit to normal. The release of relay RD disconnects (+) from the incoming sleeve conductor for effecting the release of the selector, finder and line circuits. The release of relay DD closes a circuit for release magnet Z of the XY switch which may be traced from (+), break contact of relay TD, break contact of relay DD, X or Y off-normal contact 3XON or 3YON and winding of magnet Z to (—). This circuit is also extended by way of conductor 90 and minor switch off-normal contact 1MON to the minor switch release magnet MZ for releasing this switch. When these switches have reached their normal positions, the associated off-normal contacts open up for de-energizing the release magnet. During the operation of magnet Z, the connector is protected against seizure by applying (+) to the incoming sleeve by way of a circuit which may be traced from (+), make contact of magnet Z, conductor 62, break contact of relay RD and sleeve conductor S.

It will now be explained how the circuits function on a call to a busy called line. Relays PD and PH release in sequence following the transmission of the station digit as previously described. The release of relay PH effects the release of relay RV and the release of relay RV effects the release of relays DA and DC all in the previously described manner. During the interval between the release of relays PD and RV, the busy test relay BT is connected to the sleeve conductor of the called line over a circuit which was previously described. Since it is assumed that the called line is busy, (+) potential will be found on the sleeve terminal to which wiper S is connected and will be extended over this circuit to the winding of relay BT for operating this relay. Relay BT closes a locking circuit for itself extending from (+), make contact of relay DD, conductor 65, make contact of relay BT, conductor 85, break contact of relay RV, conductor 67, make contact of relay RD, conductor 66 and winding of relay BT to (—). Relay SW is not operated on a call to a busy line because there is no (—) potential found on the sleeve wiper and the upper winding of the SW relay is short circuited at a make contact of relay BT. Since relay SW does not operate, its locking circuit is not closed and (+) is not connected to wiper S, since conductor 41 is held open. Since relay SW is not operated, the circuit to relay PU is maintained open so that this relay is not operated and, of course, the ringing and talking circuits to the called line by way of the T and R wipers are maintained open at open contacts of the SW relay. The RV relay is not operated from the minor switch wiper on a call to a busy line because this circuit is open at an open make contact of the SW relay.

The busy tone is applied to the calling line over a circuit which may be traced from the busy tone source (lower portion of Fig. 12), make contact of relay BT, conductor 135, break contact of relay PH, conductor 82, break contact of relay SW, conductor 49, lower winding of relay AB, conductor 57, break contact of relay SW, conductor 55, condenser C1, break contact of relay AB, make contact of relay RD, break contact of relay TD and over the tip side of the switch circuits to the calling line.

Relay RC is operated on a call to a busy line, in the event that the busy line is not the calling line. This is effected by inserting the upper winding of the RC relay in the incoming sleeve conductor for energizing this relay and for locking it energized until the release of the connection. The circuit is effective when relay DC is released and may be traced from (+), make contact of relay RD, upper winding of relay RC and conductor S to the sleeve of the calling line. The upper winding of relay RC is included in this sleeve conductor at this time because the left hand terminal of the upper winding of relay RC, extending by way of conductor S through a make contact of relay DC to conductor 62, finds (+) (conductor 62) only as long as relay DC is operated with conductor S and conductor 62 disconnected at the inner upper break contact of relay BT. Consequently, when relay DC releases, (+) is removed from the left hand terminal of the upper winding of relay RC resulting in the operation of this relay to (—) over the incoming sleeve conductor, this (—) extending through the windings of the cut off relay at the line circuit and the holding relays of the selector and finder circuits. The operation of relay RC closes a locking circuit for itself extending from conductor MG, make contact of relay RC, conductor 48 and its lower winding to (—). The operation of relay RC short circuits its upper winding for removing the resistance of this winding from the incoming sleeve conductor. The operation of relay RC opens up conductor 63 to guard against the operation of the SW relay on this class of call.

A circuit is closed for intermittently operating relay AA which may be traced from common interrupter conductor INT, uppermost make contact of relay RC, conductor 59, break contact of relay PH, conductor 35, make contact of relay BT, conductor 87 and winding of relay AA to (—). This intermittent operation of relay AA performs no function on a local call, its function being later described in connection with a toll call. When the calling party hangs up in response to receiving the busy signal, the CB, RD and DD relays are released in the previously described manner for clearing out the circuits. Of course, in this example, the called sleeve conductor is not disturbed, the SW relay does not need to be released and the RA relay has not been operated because there was no ringing or talking circuit established during a connection to a called busy line.

It will now be explained how the circuits function on a reverting call, i. e., when the calling party calls a station on the same line, it being understood that this line will test busy when the called line test is made in the previously described manner. This means that relay BT will be operated and locked when relay PD is released. Now when relay PH is released, busy tone is applied to the calling line in the previously described manner. Likewise, relay RV is released by the release of relay PH and relays DA and DC are released by the release of relay RV.

The release of relay DC again disconnects incoming sleeve conductor S from grounded conductor 62 in the previously described manner, since relay BT is operated for disconnecting these two conductors. This connects the upper winding of relay RC in series with the incoming sleeve conductor, as previously described, but the upper winding of relay RC is short circuited at this time over the circuit which will now be described. The right hand terminal of the upper winding of relay RC extends through a make contact of relay RD to (+). The left hand terminal of the upper winding of relay RC may be traced back over the incoming sleeve conductor to the calling line circuit and, since the calling line is the called line, this sleeve conductor may be traced by way of the terminal and sleeve wiper S of the connector, conductor 37, break contact of relay TD, conductor 41, break contact of relay RV, conductor 125, make contact of relay BT, conductor 63, break contact of relay RC and make contact of relay RD to (+). This short circuit across the upper winding of relay RC prevents its operation. Now when relays CB and RD are released in response to the calling party hanging up the receiver when the busy tone is heard, relay DD is locked operated over a circuit which may be traced from (+), break contact of relay CA, conductor 50, break contact of relay AA, conductor 64, break contact of relay RD, break contact of relay RC, conductor 63, make contact of relay BT, conductor 125, break contact of relay RV, conductor 41, break contact of relay TD, conductor 37, sleeve wiper S and its associated terminal, back through the line circuit to the incoming sleeve conductor S, break contact of relay RD, break contact of relay TD, make contact and winding of relay DD to (+). The release of relay RD disconnects the incoming line conductors T and R from the windings of the CB relay to prevent ringing current being applied to the windings of this relay when ringing is applied to the line circuit.

Relay BT is now released because the circuit to its winding, including conductor 66, is open at make contacts of relays RC and RD. It will be observed that the upper winding of relay RC is short circuited through normally closed break contacts of relay RD at this time. Relay SW is now operated over a circuit which may be traced from (+), break contact of relay CA, conductor 50, break contact of relay AA, conductor 64, break contact of relay RD, break contact of relay RC, conductor 63, upper winding of relay SW, conductor 125, break contact of relay RV, conductor 41, break contact of relay TD, conductor 37, sleeve wiper S of the connector and the sleeve conductor to the calling line circuit by way of the winding of the cut off relay to (−). This circuit is effective when relay BT releases to remove the short circuit from the upper winding of the SW relay. Relay SW now locks over a circuit extending from conductor MG, make contact and lower winding of relay SW to (−).

The ringing operation is now controlled in the previously described manner for ringing the called bell. When either party removes the receiver, relay RT is operated, relay RA is operated and locked, relay PU is released, relay AB is operated and relay AA is operated, all in the previously described manner. The operation of relay AA opens up conductor 64 for de-energizing conductor 41 and wiper S, thus de-energizing incoming sleeve S and conductor 62 for releasing relay DD. This disconnection of (+) from the incoming sleeve circuit effects the release of the selector, the finder and the line circuit, the latter circuit going into its locked out condition. The release of relay DD disconnects (+) from master ground conductor MG for effecting the release of relays SW and RA. The release of relay SW disconnects the called line circuit (by way of connector wipers T and R) from the windings of relay AB for effecting the release of this relay, which in turn opens up and releases relay AA. The release of relay DD closes the previously described circuits for release magnets Z and MZ for releasing the connector and minor switches, the operation of magnet Z applying (+) to incoming sleeve conductor S for making this connector busy until the release operation is completed. Talking battery is fed to the line on a reverting call connection through the line relay of the line circuit, this line relay operating to make the line busy until the clearing out operation is effected, at which time the line relay of the line circuit is released to place the circuits in normal condition.

It will now be explained how the time release feature of the connector circuit operates. As soon as relay DD of the connector operates in response to the seizure of this switch, the permanent signal time out circuit is effective, i. e., the connection will be automatically released if the talking connection is not completed within a predetermined time interval following the operation of relay DD. The operation of relay DD connects common pickup conductor TP1 by way of a break contact of relay AB, conductor 32 and break contact of relay CT to the upper winding of relay CA. This common conductor is given a short pulse at the beginning of the permanent signal time out period to operate the CA relay which locks over a circuit from (+) on conductor MG, break contact of relay RT, break contact of relay TA, conductor 106, make contact and lower winding of relay CA to (−). The common hold conductor H2 is energized at the time that conductor TP1 is pulsed and remains energized throughout the time interval, at the end of which the connection will be released if the talking circuit is not completed. The operation of relay CA substitutes grounded conductor H2 for the (+) which was connected to conductor 50 for holding relay RD energized. Consequently, if the call is answered before the H2 conductor is de-energized, the operation of trip relay RT disconnects conductor MG from conductor 106 for releasing relay CA and restoring direct (+) to the holding circuit for the RD relay. The answering of the call switches common conductor TP1 from the CA relay to the CT relay for energizing this relay as will be later described. If the call is not answered before common conductor H2 is de-energized, the circuit including conductor 50 is de-energized for effecting the release of relay RD for releasing the connection and causing the calling line to go to its locked-out condition in the previously described manner.

The conversation time release is effective when the call is answered and relay AB operates for connecting conductor TP1 by way of conductor 31, break contact of relay HT, conductor 33, break contact of relay CA, conductor 127 and upper winding of relay CT to (−). Relay CT operates and closes a locking circuit for itself extending from conductor MG, break contact of relay CA, make contact and lower winding of relay CT to (−). Common conductor TP2 is momentarily pulsed about two minutes after the pulse is applied to conductor TP1 and closes a circuit for operating relay CA which may be traced from conductor TP2, make contact of relay CT, conductor 128 and upper winding of relay CA to (−). Relay CA closes a locking circuit for itself extending from conductor MG, break contact of relay RT, break contact of relay TA, conductor 106, make contact and lower winding of relay CA to (−). The operation of relay CA opens up the above described locking circuit of relay CT including the MG conductor and transfers this locking circuit to hold conductor H1 at the make contact of relay CA. Conductor H1 is energized at the time that conductor TP2 is pulsed and remains energized for approximately two minutes after the pulse is applied to conductor TP2. At the end of this two minute interval, the de-energization of conductor H1 opens up the locking circuit for relay CT for effecting the release of this relay. During the time that conductor H1 is energized and for approximately two minutes after its de-energization, conductor H2 is energized for maintaining (+) potential on the holding circuit for the RD relay, including conductor 50. Consequently, if the connection is maintained until the end of this last (third) two minute interval, conductor H2 will be de-energized for releasing relay RD for in turn clearing out the connector, selector and finder circuits for causing the line circuit to go into its locked out condition. It will thus be seen that, if relay AB is operated in response to the answering of the call at or near the time that conductor TP1 is pulsed, the connection will be automatically released in approximately six minutes thereafter. In the event that relay AB is operated shortly after the pulse is applied to conductor TP1, then approximately six minutes will be measured off before the start of the cycle, at which time the pulse on conductor TP1 is effective to start the time out operation, thus measuring off approximately six minutes thereafter or approximately a total of twelve minutes before the connection is released. The common apparatus is arranged to apply a warning tone to the connection shortly before it is automatically released. This is accomplished by an impulse of (+) potential applied to common conductor CWT (right hand portion of Fig. 13) for operating pickup relay PU over a circuit extending from conductor CWT, make contact of relay CA (operated during the last two-minute interval), break contact of relay CT (released during the last two-minute interval), conductor 138, make contact of relay AA, conductor 111, make contact of relay RA, conductor 110, make contact of relay SW and winding of relay PU to (−). The operation of this relay connects a warning tone to the connection over a circuit which may be traced from the tone source (upper right hand portion of Fig. 12), make contact of relay CA, conductor 36, make contact of relay AA, conductor 95, make contact of relay RA, conductor 96, make contact of relay PU, condenser C5, conductor 53, condenser C2 and over the previously described talking circuit to the line. The warning tone is therefore applied to the connection at a predetermined time interval before the automatic disconnect operation is affected as a signal for the calling party to hang up the receiver.

It will now be explained how the connector operates in connection with a toll call. When the connector is seized, relays CB, RD, DD, XD, YD, PD, PH, DA and DC are operated and locking circuits are closed for relays DD, PD, DA and DC, all in the previously described manner. Furthermore, the incoming sleeve conductor S and the master ground conductor MG are connected to (+) in the previously described manner. (+) through the upper winding of relay TA is connected to the incoming HS lead when the connector is seized and when relay XD is operated, direct (+) is applied to the HS conductor as previously explained.

Relay HA operates, locks and operates magnet X in response to the impulses received in the previously described manner. In this example, relay TA is operated when the switch takes its first step off normal over a circuit extending from (+), upper winding of relay TA, conductor 115, break contact of relay AA, conductor 114, break contact of relay TA, make contact of relay XD, (conductor 100 being disconnected from (+) at a break contact of the X off normal 1XON), conductor 51, break contact of relay TD and conductor HS to (—), this (—) being applied at the calling position when the dial is turned off normal. Relay TA operates and closes a locking circuit for itself extending from conductor MG, make contact and lower winding of relay TA to (—). The operation of relay TA connects conductor HS to the lowermost contact of relay AA, this contact serving to provide supervision as will later be described.

Relay PT is operated over a circuit extending from conductor MG, make contact of relay TA, conductor 98, make contact of relay PD, conductor 99 and winding of relay PT to (—). Dial tone is connected to the calling line, in a connector type system, over the previously described circuit. When the tens digit has been transmitted, relay XD is released for opening up the operating circuit for relay PD, but this relay does not release because it is locked in its operated position, all in the previously described manner. Relay RV is not operated on a call of this class when the switch takes its X step because the circuit including conductor 105 is open at a break contact of relay TA.

In response to the units digits, relay HA is operated and locked for operating the Y stepping magnet over a circuit which was previously described, and relay RV is operated when the switch takes its first Y step over the previously described circuit including conductor 140. The operation of relay PT prevents the operation of relay PU in response to the operation of relay SW by opening up conductor 112. This holding off of the operation of relay PU holds off ringing until the station digit is dialed, while permitting the operation of relay SW in response to the units digit for permitting the connection to and the holding of the called line by the toll operator on a delayed ring call. The operation of relay PT also changes the test circuit for the called line from a point following the station digit to a point following the units digits.

After the units digit is dialed, relay YD releases and connects busy relay BT to the sleeve conductor of the called line so that this line may be tested following the units digit. This circuit may be traced from the winding of relay BT, conductor 66, make contact of relay RD, conductor 67, make contact of relay RV, make contact of relay DA, conductor 74, break contact of relay YD, make contact of relay PT, conductor 41, break contact of relay TD, conductor 37 and sleeve wiper S to the sleeve terminal of the called line. It will first be assumed that the called line is idle. The release of relay YD effects the release of relay PH because relay PT is now operated for extending conductor 80 by way of a break contact of relay YD, conductor 78, make contact of relay PH to conductor 52, this conductor being de-energized at this time. The release of relay PH opens up and releases relay RV. The release of relay RV disconnects relay BT from the sleeve wiper S and connects this wiper to the winding of relay SW for operating this relay over the previously described circuit including the upper winding of relay SW and battery on the called sleeve. Relay SW operates and closes a locking circuit for itself as previously described. Relays DA and DC do not release this time in response to the release of relay RV, since a holding circuit is closed for these two relays extending from a make contact of relay PT and conductor 97. (+) is connected to the called sleeve conductor S over a circuit extending from (+), make contact of relay RD, break contact of relay RC, conductor 63, make contact of relay SW, conductor 41, break contact of relay TD, conductor 37 and wiper S to the sleeve terminal of the called line.

On a toll call the permanent signal time release feature is effective up to the time when the units digit is dialed. When relay YD releases at the end of the units digit, conductor 106 is opened (since relay TA is operated), thus preventing the locking of relay CA. This prevents the operation of the permanent signal time release because relay CA cannot stay operated up to the point where (+) is removed from conductor H2.

Following the dialing of the units digit, the called line is made busy to other calls and the called line tip and ring conductors are connected through the windings of the AB relay over circuits which may be traced from wiper T of the connector, make contact of relay SW, conductor 72, break contact of relay RA, make contact of relay TA, make contact of relay PT, conductor 56, make contact of relay SW, conductor 57, to the lower winding of relay AB. Wiper R may be traced through a make contact of relay SW, conductor 69, break contact of relay RA, make contact of relay TA, make contact of relay PT, conductor 71, break contact of relay BT and conductor 58 to the upper winding of the AB relay. This permits a station on the called line to transmit a signal to the calling operator, when this operator is off the connection temporarily, by permitting the operation of the AB relay for reversing the battery back to the operator's circuit.

When the operator is ready to complete the ringing circuit, the station digit is dialed for effecting the stepping of the minor switch magnet MX by the lock pulse relay HA, relay PD being released at the end of the station digit transmission, all in the previously described manner. The release of relay PD opens up and releases relay PT and this relay in turn disconnects conductor MG from conductor 107 for opening up the locking circuits of the DA and DC relays for effecting the release of these relays. When relay PD releases, relay RV can be operated over a circuit including minor switch wiper DE, conductor 101, break contact of relay RA, conductor 102, break contact of relay PD, conductor 103 and break contact of relay DA to conductor MG, if the station digit dialed was of the proper value for operating the RV relay.

Pick up relay PU is now operated from pick up conductor PU1 and locked from holding conductor HG, in the previously described manner for transmitting the selected ringing signal to the called line. When the call is answered, relays RT, RA, AB and AA are operated, and relay RA is locked and relays PU and RT are released, all in the previously described manner. The operation of relay AA switches the incoming HS conductor from (+) through the upper winding of relay TA to (—) through resistor 15RS to provide supervision, when this supervision is arranged for operation over the HS conductor. The previously described talking circuit is now completed through condensers C1 and C2 and when the called party hangs up, relays AB and AA release for switching conductor HS back to (+).

When the calling station disconnects, relays CB, RD, DD, SW, RA and TA are released, the release of relay DD disconnecting (+) from the master ground conductor and the release of relay RD removing (+) from the called sleeve conductor. The release of relay TA again connects (+) through its upper winding to conductor 51 leading back to the incoming HS conductor. The release of relay DD closes the previously described release circuits for the XY and the minor switch magnets for releasing these switches and for applying a guarding (+) to the incoming sleeve conductor while the release operation is taking place.

In the event that the called line is busy, relay BT will operate on this class of call when relay YD releases, this circuit being traced from (+) on the sleeve terminal of the busy called line, wiper S, conductor 37, break contact of relay TD, conductor 41, make contact of relay RV, break contact of relay DC, make contact of relay DA, make contact of relay RV, conductor 67, make contact of relay RD, conductor 66 and winding of relay BT to (—). Relay RC operates and locks in the same manner as described in connection with the other type of call to a busy line. Now when relay PH releases, relay RV is released for closing a locking circuit for relay BT which may be traced from (+), make contact of relay DD, conductor 65, make contact of relay BT, conductor 85, break contact of relay RV, conductor 67, make contact of relay RD, conductor 66 and winding of relay BT to (—). The busy tone is applied to the calling line over a circuit which may be traced from the busy tone source, make contact of relay BT, conductor 135, break contact of relay PH, conductor 82, break contact of relay SW, conductor 49, lower winding of relay AB, conductor 57, break contact of relay SW, conductor 55 and condenser C1 to the calling line circuit. Relay AA is now operated from the common interrupter for flashing the calling operator supervisory signal by switching the incoming HS conductor from (+) to (—). The circuit for relay AA extends from the common interrupter conductor INT, make contact of relay RC, conductor 59, break contact of relay PH, conductor 35, make contact of relay BT, conductor 87 and winding of relay AA to (—).

Since relay SW is not operated on a call to a busy line, the ringing and talking circuits to this line are not completed. Now when the calling operator disconnects, relays CB, RD and DD are released for releasing the switches in the previously described manner ready for another call.

It will now be explained how the connector operates in connection with a call which requires transforming the connector into a selector for switching through to a trunk circuit or the like on a particular level. When the connector is seized, relays CB, RD, DD, XD, YD, PD and PH are operated, the incoming sleeve conductor is connected to (+) and (+) is applied to master ground conductor MG, all in the previously described manner. The dial tone is connected to the calling line (in a connector type system) by the operation of relay XD and the locking circuit is completed for relay PD, in the previously described manner. In this example, relays DA and DC are not operated at this time because the switching through feature of the connector is only used in a connector type system, consequently the jumper connection between terminals H and H1 is omitted. It will be assumed that digit 0 is dialed to advance the connector switch to the tenth or switching through level, consequently a jumper connection is provided between terminal C and the tenth level bank contact of wiper XX, as indicated by the dotted line.

When digit 0 is dialed, relay CB repeats the ten impulses to relay HA and this relay operates the X magnet in the previously described manner, this time advancing the connector switch to the tenth level. When relay XD releases at the end of the digit, the operating circuit, including conductors 92 and 119, for relay PD is opened but this relay remains operated by means of its locking circuit which may be traced from conductor MG, break contact of relay DA, make contact of relay PD, minor switch off normal contact 2MON and upper winding of relay PD to (—). Relay DA is now operated over a circuit extending from (+), break contact of magnet Z, make contact of relay DD, conductor 92, break contact of relay XD, conductor 76, break contact of relay DC, make contact of relay PH, conductor 133, terminal G and jumper to terminal G1, wiper XX and the tenth level terminal, jumper and terminal C, conductor 129, break contact of relay HT, break contact of relay DC, break contact and upper winding of relay DA to (—). Relay DA closes a locking circuit for itself extending from conductor MG, make contact of relay PH, conductor 116, make contact of relay DA, conductor 121 and upper winding of relay DA to (—). Relay DC is not operated on this class of call because relay PT is not operated and because there is no jumper between terminals H and H1.

Referring back to the point in the operation where the switch takes its first X step, a circuit is closed for operating relay RV which may be traced from (+), make contact of relay XD, break contact of relay TA, conductor 105, break contact of Y off normal 1YON, make contact of X off normal 1XON, break contact of relay SW, conductor 139 and winding of relay RV to (—). Now when relay XD releases at the end of the digit, this circuit is opened for releasing relay RV. The operation of relay DA opens up the circuit of the lower winding of relay YD by disconnecting conductor MG from this winding for effecting the release of the YD relay. Since the locking circuit for relay PD included this same circuit, the de-energization of conductor 103 by the operation of relay DA also effects the release of relay PD.

At the end of the digit, after the release of relay XD, relay HA is again energized over a circuit which may be traced from (+), break contact of magnet Z, make contact of relay DD, conductor 92, break contact of relay XD, conductor 76, break contact of relay DC, make contact of relay DA, conductor 133, terminals G and G1, wiper XX and terminal C, conductor 129, break contact of relay HT, conductor 122, break contact of relay DC, make contact of relay DA, break contact of relay HT, conductor 117, break contact of magnet X, break contact of magnet Y, conductor 118, break contact of magnet MX, conductor 52, lower winding of relay HA and its break contact to (—). Relay HA closes a locking circuit for itself which may be traced from conductor MG, make contact of relay PH, conductor 116, make contact of relay HA, break contact of magnet X, break contact of magnet Y, conductor 118, break contact of magnet MX, conductor 52, lower winding of relay HA and resistor 14RS to (—). Relay HT is operated in response to the release of relay YD over a circuit which may be traced from (+) by way of wiper XX and terminal (previously described), terminal C, conductor 129, break contact of relay HT, break contact of relay DC, make contact of relay DA, conductor 68, break contact of relay YD, conductor 42 and winding of relay HT to (—). Relay HT closes a locking circuit for itself at its X contact (which makes first) extending from conductor MG, make contact of relay HT, conductor 68, break contact of relay YD, conductor 42 and winding of relay HT to (—).

The Y magnet is now energized to cause the switch to take its first Y step over a circuit which may be traced from conductor MG, make contact of relay HA, break contact of relay XD, break contact of relay YD, conductor 108, make contact of relay DA, make contact of relay PH, make contact of relay HT, conductor 93 and winding of Y magnet Y to (—). The operation of magnet Y opens up the above described locking circuit for relay HA for releasing this relay, which in turn opens up the above described operating circuit for magnet Y for releasing this magnet, thus advancing the switch to the first terminal in the 0 level. When the Y magnet takes the first step, relay RV is again operated over a circuit extending from (+), make contact of relay PH, conductor 140, contact 1YON, contact 1XON, break contact of relay SW, conductor 139 and winding of relay RV to (—).

With RV operated and with wiper S in contact with the first terminal of the selected level, relay BT is connected to this terminal to determine if the trunk is idle or busy. It will first be assumed that the first trunk is busy, consequently relay BT is operated over a circuit extending from (+) on the terminal and wiper S, conductor 37, break contact of relay TD, conductor 41, break contact of relay PT, conductor 75, break contact of relay PD, make contact of relay DA, make contact of relay RV, conductor 67, make contact of relay RD, conductor 66 and winding of relay BT to (—). With relay BT operated, a circuit is closed for again operating relay HA to cause the switch to take another step in the Y direction by operating the Y magnet over the previously described circuit. This circuit for operating relay HA may be traced from conductor MG, make contact of relay PH, conductor 116, make contact of relay BT, conductor 137, make contact of relay HT, conductor 117, break contacts of the X and Y magnets, conductor 118, break contact of magnet MX, conductor 52 and the lower winding of relay HA to (—) through its own break contact. Relay HA locks and when the magnet takes the second step the above described locking circuit for relay HA is opened for releasing this relay, which in turn deenergizes magnet Y leaving the switch in contact with its second set of terminals. The above circuit is now completed for relay BT, consequently this relay will be operated at each step when the selected terminal is found busy for causing the switch to step away from busy terminals.

The operation of relay BT connects conductors 63 and 125 together for short circuiting the upper winding of relay SW, thus preventing any chance of operating relay SW as long as busy terminals are encountered. Furthermore, the operation of relay BT disconnects incoming sleeve conductor S from conductor 62 for inserting the upper winding of relay RC in the incoming sleeve conductor for operating and locking the RC relay in the previously described manner. When the first idle trunk is reached, there is no (+) potential on the circuit to the winding of relay BT by way of wiper S, consequently the BT relay is released. During the above described hunting operation of the connector switch, conductor 52 is energized at each step for holding relay PH energized over a circuit which may be traced from conductor 52, make contact of relay PH, break contact of relay PD, conductor 79, break contact of relay PT, conductor 80 and winding of relay PH to (—). During the intervals of the stepping cycle of the Y magnet when conductor 52 is deenergized, relay PH is not released because of its slow acting characteristics.

Relay PH is de-energized and released when the switch reaches its idle terminal, because the conductor 52 is deenergized long enough to permit the release of relay PH and effect the release of relay RV by opening up the contact which energizes conductor 140. The release of relays PH and RV disconnects conductor MG from conductor 116 for opening up the above described locking circuit for relay DA for effecting the release of this relay.

A circuit is closed for operating relay TD which may be traced from (+), break contact of magnet Z, make contact of relay DD, conductor 92, break contact of relay XD, conductor 76, break contact of relay DC, make contact of relay DA, conductor 133, terminals G and G1, wiper XX, terminal C, conductor 129, make contact of relay HT, conductor 131, break contact of relay BT, conductor 130, break contact of relay PH, conductor 60, break contact and winding of relay TD to (—). Relay TD locks itself operated over a circuit extending from (+), make contact of relay RD, conductor 62, break contact of relay BT, conductor S, make contact and winding of relay TD to (—). The release of relays PH and RV disconnects conductor MG from conductor 116 for opening up the above described locking circuit for relay DA for effecting the release of this relay. The selected trunk is made busy by applying (+) to wiper S when relay TD operates over a circuit which may be traced from (+), make contact of relay RD, make contact of relay RC, make contact of relay TD, conductor 37 and wiper S to the sleeve terminal of the called line.

The operation of relay TD switches the incoming T and R line conductors from the windings of relay CB to the T and R wipers for effecting the release of relay CB of the connector and the operation of the CB relay of the selected trunk circuit, not shown. Tracing this circuit from incoming conductor T, it extends through a make contact of relay TD, conductor 54 and wiper T of the connector switch. Incoming conductor R may be traced through a make contact of relay TD, conductor 40 and wiper R of the connector switch. It will be understood that the operation of the CB and RD relays of the selected trunk circuit extends (+) back over the sleeve terminal and wiper S of the connector for providing a holding circuit for the TD relay and for extending this (+) back over the incoming sleeve conductor, before the (+) is disconnected from this circuit by the release of relay RD of the connector. It will thus be seen that relay SW is not operated on this type of call and, consequently the ringing and talking circuits are not used, the connector acting as a selector for automatically selecting an idle trunk. The operation of relay TD opens up the circuit to the winding of relay RD for effecting the release of this relay, which in turn opens up and releases relay DD. Relay DD disconnects (+) from the master ground conductor MG for effecting the release of relays RC and HT. When the connection is released, (+) is disconnected at the selected trunk from the terminal to which wiper S is connected for opening up the locking circuit of relay TD for effecting the release of this relay. This also disconnects (+) from incoming sleeve conductor S for releasing the preceding circuits. The release of relay TD closes the above described circuit for the connector and minor switch release magnets for effecting the release of these switches, thus restoring the connector link to normal. During the release operation, magnet Z applies (+) to the incoming sleeve conductor for making the switch busy until it has been restored to normal.

It will now be explained how the circuits operate when all of the trunks in a selected switching through level are busy. The Y magnet steps the switch around in the previously described manner and when it reaches the last trunk of the group, assumed to be busy, relay HA is locked operated for holding magnet Y energized until relay PH slowly releases. This is accomplished because the last terminals of the trunk group to which wipers S and HS connect are bridged through a high resistance coil, approximately 3900 ohms, for providing a locking circuit for the HA relay. Consequently, when this last trunk is reached and found busy, a circuit may be traced from (+) on the sleeve terminal of the selected trunk circuit, through the 3900 ohm resistance coil (not shown), terminal and wiper HS, conductor 44, break contact of relay PD, make contact of relay DA, make contact of relay RV, make contact of relay HT, conductor 47, make contact of relay BT (operated because this trunk is busy), conductor 46, upper winding of relay HA, make contact of relay HA and resistor 14RS to (—). This locks relay HA operated and permits the release of relay PH because its locking circuit is now held open at the break contact of magnet Y. The release of relay PH opens up the operating circuit to magnet Y for effecting the release of this magnet. Relay RV is released because relay PH releases and removes (+) from conductor 140. The release of relay RV opens up the above described locking circuit for relay HA, including conductors 47 and 46, thus effecting the release of relay HA. With relays PH and RV released, conductor 116 is de-energized for opening up the locking circuit of relay DA for effecting the release of this relay. Relay BT is not released at this time, it being locked operated over a circuit which may be traced from (+), make contact of relay DD, conductor 65, make contact of relay BT, conductor 85, break contact of relay RV, conductor 67, make contact of relay RD, conductor 66 and winding of relay BT to (−). Relay TD is not operated at this time because relay BT keeps the winding of the TD relay open.

Since relay TD does not operate, there is no connection made to the selected trunk circuit and the CB, RD, DD, HT, and RC relays are not released because the master ground conductor is maintained energized at the closed make contact of relay DD. Busy tone is now applied to the calling line over a circuit extending from the common busy tone source, make contact of relay BT, conductor 135, break contact of relay PH, conductor 82, break contact of relay SW, conductor 49, lower winding of relay AB, conductor 57, break contact of relay SW, conductor 55, condenser C1 and thence to the incoming line circuit. Furthermore, the release of relay PH closes a circuit for intermittently operating relay AA extending from common flashing interrupter INT, make contact of relay RC, conductor 59, break contact of relay PH, conductor 35, make contact of relay BT, conductor 87 and winding of relay AA to (−). Relay AA performs no function on a call of this class. When the connection is released, relays CB, RD and DD are released for removing (+) from conductor MG for effecting the release of relays HT, BT and RC, thus restoring the connector circuits to normal and disconnecting (+) from the incoming sleeve conductor.

It will now be explained how the connector circuit operates when a restricted line dials the switching through level. When the connector operates in connection with lines of this type, terminal D, instead of terminal C, is connected to the XX bank of the switching through level. Furthermore, restricted lines have (+) potential applied to the HS conductor at these line circuits. Relay RV operates at the beginning of the transmission of the first digit dialed into the connector, as before, but this relay does not release when relay XD is released at the end of the series of impulses. This is because the circuit from (+) on conductor HS of a restricted line is extended through a break contact of relay TD, conductor 51, break contact of relay XD, break contact of relay TA, conductor 105, contact 1YON in its normal position, contact 1XON in its operated position, break contact of relay SW, conductor 139 and winding of relay RV to (−). Consequently, the continued energization of the RV relay after the digit is transmitted prevents the application of (+) potential to conductor 52 by way of conductors 133 and 129 as before, because conductor 129 is opened at terminal C and at the break contact of relay RV. Therefore, relay HA does not operate and the Y magnet does not step. Since conductor 129 is not energized, relay DA does not operate and relays YD and PD do not release. Therefore, relay HT does not operate and relay BT is prevented from operating. The calling party gets the busy tone over a circuit extending from the busy tone source, conductor 134, break contact of relay DC, conductor 81, make contact of relay YD, break contact of relay XD, conductor 82, break contact of relay SW, conductor 49, lower winding of relay AB, conductor 57, break contact of relay SW, conductor 55, condenser C1 and over the calling line circuit.

The connection is released when the calling party hangs up the receiver for effecting the release of relays CB, RD and DD as before. In the event that the call is from a non-restricted line, there is no (+) potential on conductor HS for holding relay RV operated when relay XD is released. Consequently, relay RV is released and the HA relay operates for stepping the switch in its Y direction in the previously described manner. In the event that a toll line calls a restricted level the operation of the TA relay opens up the above described holding circuit for the RV relay by opening up conductor 105, thus permitting the release of relay RV and the consequent selecting operation of the connector switch in the previously described manner.

It will now be described how the P. B. X hunting feature of the connector operates, both in connection with a local call and in connection with a toll call, it being recalled that, on a local call, the called line test is made after the station digit and on a toll call it is made after the units digit. Considering a local call first, at the end of the station digit, relay PD releases. In this case, however, relays PH, RV, DA and DC are not released until after the connector switch finds the idle P. B. X line.

Assuming that the first line of the P. B. X group is busy when relay PD releases, a circuit is closed for operating relay BT which may be traced from (+) on the busy sleeve terminal of the called line, wiper S, conductor 37, break contact of relay TD, conductor 41, break contact of relay PT, conductor 75, break contact of relay PD, make contact of relay DA, make contact of relay RV, conductor 67, make contact of relay RD, conductor 66 and winding of relay BT to (−). Since relay DC is operated at this time, conductors S and 62 are connected together for short circuiting the upper winding of the DC relay for preventing the operation of this relay. Relay HT is now operated from (+) (connected to the HS terminal of the first line of the P. B. X group), wiper HS, conductor 44, break contact of relay PD, make contact of relay DA, make contact of relay RV, break contact of relay HT, conductor 68, break contact of relay YD, conductor 42 and winding of relay HT to (−). Relay HT closes a locking circuit for itself extending from (+) on the MG conductor, make contact of relay HT, conductor 68, break contact of relay YD, conductor 42 and winding of relay HT to (−). The operation of relay HT opens up the circuit to the operating winding of the CT relay for preventing the operation of this relay on a call of this class.

The lock pulse relay HA is now operated over a circuit which may be traced from conductor MG, make contact of relay PH, conductor 116, make contact of relay BT, conductor 137, make contact of relay HT, conductor 117, break contacts in series of the X and Y magnets, conductor 118, break contact of magnet MX, conductor 52, lower winding of relay HA and its own break contact to (−). Relay HA is locked operated over a circuit which may be traced from (+) on conductor 116, above described, and over the previously described circuit, including the lowermost make contact of relay HA. The Y magnet is now energized over a circuit which may be traced from conductor MG, make contact of relay HA, break contact of relay XD, break contact of relay YD, conductor 108, make contact of relay DA, make contact of relay PH, make contact of relay HT, conductor 93 and winding of magnet Y to (−). The operation of magnet Y opens up the above described circuit to the HA relay, including conductors 118 and 52, for effecting the release of this relay, which in turn opens up and releases magnet Y. The above described circuits are now completed for again operating and locking relay HA which in turn operates magnet Y for releasing relay HA which in turn releases magnet Y. This interaction between the HA relay and the Y magnet continues as long as relay BT is operated for completing the above described circuit including conductor 137. During this intermittent operation of the HA relay and the intermittent energization of conductor 52, relay PH is intermittently energized over a circuit which may be traced from conductor 52, make contact of relay PH, break contact of relay PD, conductor 79, break contact of relay PT, conductor 80 and winding of relay PH to (—). This intermittent energization of relay PH prevents its release while the connector switch is hunting, since the relay is a slow acting relay and will not release during the intervals when conductor 52 is de-energized.

When the idle line of the group is reached, there is no (+) on wiper S for holding relay BT, this relay releases and effects the release of relay PH and prevents the operation of the HA relay by disconnecting energized conductor 116 from conductor 52 leading to the HA and PH relays. This stops the Y stepping operation and when relay PH is released the circuit to relay RV is opened for effecting the release of this relay. With relays PH and RV released, conductor MG is disconnected from conductor 116 for opening up the locking circuits of the DA and DC relays for effecting the release of these relays. Relay SW is operated when relay RV releases over a circuit extending from (+), make contact of relay RD, break contact of relay RC, conductor 63, upper winding of relay SW, conductor 125, break contact of relay RV, conductor 41, break contact of relay TD, conductor 37, wiper S and over the sleeve conductor of the called line to (—) through the cut off relay of this line circuit. Relay SW locks and applies (+) to the called sleeve in the previously described manner. The ringing, talking and release circuits are now controlled in the previously described manner.

In the event that the last line in the P. B. X group is busy when relay HA operates to energize the Y magnet for stepping the switch on to the terminals of this line, this relay is locked over a circuit which may be traced from (+) on the sleeve terminal of the busy line, through the resistance which bridges the S and HS terminals of the last line of the P. B. X group, terminal and wiper HS, conductor 44, break contact of relay PD, make contact of relay DA, make contact of relay RV, make contact of relay HT, conductor 47, make contact of relay BT, conductor 46, upper winding of relay HA, make contact of relay HA and resistor 14RS to (—). This holds relay HA and magnet Y energized until relay PH releases and opens up the above described circuit to relay HA. Relay PH is released after a slight delay because its locking circuit is opened by the deenergization of conductor 52 at the break contact of magnet Y. The release of relay PH opens up and releases relay RV and this relay in turn opens up and releases relays DA and DC and locks relay BT over a circuit extending from (+), make contact of relay DD, conductor 65, make contact of relay BT, conductor 35, break contact of relay RV, conductor 67, make contact of relay RD, conductor 66 and winding of relay BT to (—). Relay RC is now operated over a circuit which may be traced from (+), to make contact of relay RD, conductor 65, make contact of relay BT, conductor 35, break contact of relay RC, conductor 84, make contact of relay HT, conductor 94, break contact of relay PH, conductor 48 and lower winding of relay RC to (—). Relay RC locks over a circuit extending from conductor MG, make contact of relay RC, conductor 48 and lower winding of relay RC to (—). The operation of relay RC connects common interrupter conductor INT by way of conductor 59, break contact of relay PH, conductor 35, make contact of relay BT, conductor 87 and winding of relay AA to (—) for intermittently operating this relay which is for the purpose of providing a flash busy signal back over conductor HS in the previously described manner for signaling the operator on a toll call. Relay SW cannot operate because the operation of relay RC opens up conductor 63 and since relay SW is not operated, no connection is made to the sleeve wiper. The busy tone is applied to the calling line from the common busy tone conductor, make contact of relay BT, conductor 135, break contact of relay PH, conductor 82, break contact of relay SW, conductor 49, lower winding of relay AB, conductor 57, break contact of relay SW, conductor 55 and condenser C1 to the calling line circuit.

In the event of a toll call to a called P. B. X line, the P. B. X hunting operation must be effected at the end of the units digit when relay YD is released. Since relays TA and PT are operated on a toll call, the release of relay YD connects sleeve wiper S to relay BT over a circuit which may be traced from this wiper, conductor 37, break contact of relay TD, conductor 41, make contact of relay PT, break contact of relay YD, conductor 74, make contact of relay DA, make contact of relay RV, conductor 67, make contact of relay RD, conductor 66 and winding of relay BT to (—). The release of relay YD also operates relay HT over a circuit extending from (+) on the first terminal to which wiper HS is connected, conductor 44, make contact of relay TA, conductor 43, make contact of relay DA, make contact of relay RV, break contact of relay HT, conductor 68, break contact of relay YD, conductor 42 and winding of relay HT to (—). Relay HT locks over a circuit extending from conductor MG, make contact of relay HT, conductor 68, break contact of relay YD, conductor 42 and winding of relay HT to (—). Relay DC, being operated, prevents the operation of the RC relay in the previously described manner. Conductor 52 is now energized for operating and locking relay HA, for locking relay PH and for energizing magnet Y over a circuit which may be traced from conductor MG, make contact of relay RV, conductor 116, make contact of relay BT, conductor 137, make contact of relay HT, conductor 117, break contacts of the X and Y magnets, conductor 118 and break contact of magnet MX to conductor 52. This causes the stepping of the switch in its Y direction until the idle line is reached, at which time relays PH, BT and RV are released and relay SW is operated and locked as above.

Relay PD must be maintained operated until the end of the station digit, consequently a circuit for this relay may now be traced from conductor MG, make contact of relay DC, make contact of relay PD, off normal contact 2MON and upper winding of relay PD to (—). Relays DA and DC are held operated after the release of relays PH and RV over a circuit which may be traced from (+), make contact of relay PT, conductor 97 and lower windings of the DC and AC relays in series to (—). During the station pulsing operation, conductor 52 is intermittently energized in the previously described manner to operate magnet MX and to hold relay PD, the circuit being traced from conductor MG, make contact of relay HA, break contact of relay XD, break contact of relay YD, conductor 108, make contact of relay DA, break contact of relay PH, make contact of relay DC, make contact and lower winding of relay PD to (—) and in multiple therewith to conductor 136 extending to the winding of magnet MX. At the end of the station digit, relay PD is released for opening up the above described circuit to magnet MX. The release of relay PD opens up and releases relay PT which in turn opens up and releases relays DA and DC. The ringing, talking and release circuits are now controlled in the previously described manner, it being noted that the conversation time release feature is cancelled when relay HT is operated by opening up conductor 33 which leads to the winding of the CT relay. On a toll call, the permanent signal time release circuit operation is cancelled after the units digit by the release of relay YD in the previously described manner.

In the event that the last line in the group is busy on a call of this class, relay HA locks for holding magnet Y energized after the units digit instead of after the station digits. This is because relay TA is operated and the circuit is extended from (+) on the busy sleeve terminal, through the jumper to the HS terminal, wiper HS, conductor 44, make contact of relay TA, conductor 43, make contact of relay DA, make contact of relay RV, make contact of relay HT, conductor 47, make contact of relay BT, conductor 46, upper winding of relay HA, make contact of relay HA and resistor 14RS to (−). This holds magnet Y operated until the PH relay releases. Conductor 52 is not energized for locking the HA and PH relays under this condition, consequently relay PH releases and relay RV is released for locking relay BT. Relays DA and DC do not release until relay PT is released at the end of the station digit, if and when this digit is dialed. Relay RC is operated and locked, the operating circuit being traced from (+), make contact of relay DD, conductor 65, make contact of relay BT, conductor 85, break contact of relay RC, conductor 84, make contact of relay HT, conductor 94, break contact of relay PH, conductor 48 and lower winding of relay RC to (−). This operation of relay RC applies the flash busy signal and prevents the operation of the SW relay in the previously described manner, the S wiper being held open and the busy tone put on the line as in the previous example. The release operation is effected as previously described.

It will now be explained how the circuits of the connector operate to select either the first or the second group of station ringing codes. It has already been explained how the RV relay functions to provide ringing either over the tip or the ring side of the called line as determined by the connection of terminal RV to the terminals of wiper DE of the minor switch. Considering first a connector type system, it will be assumed that the first digit selects the first code group, that is, codes 1 to 10. In this case, terminal A, shown in the right hand portion of Fig. 12 is connected to the terminal of the XX bank level used for selecting the first code group. It will be assumed that this is digit 3, consequently terminal A will be connected as shown by the dotted line to the third level of the XX bank. Now when relay XD is released to mark the end of the first digit, a circuit is closed for operating relay DC extending from (+), break contact of magnet Z, make contact of relay DD, conductor 92, break contact of relay XD, conductor 76, break contact of relay DC, make contact of relay PH, conductor 133, terminals G and G1, XX wiper and its associated third level terminal, terminal A, conductor 120 and upper winding of relay DC to (−). It will be recalled that the DA and DC relays are not operated in a connector type system when the switch is seized because the jumper between terminals H and H1 is omitted. In this example, the operation of relay DC closes an operating circuit for relay DA which may be traced from conductor MG, break contact of 2XON, conductor 73, make contact of relay DC, break contact of relay DA, conductor 121 and uper winding of relay DA to (−). The DA and DC relays are locked over the previously described circuits including conductor 116. This sets the circuits for further operation and when the ringing condition is set up, the first group of codes 1 to 10 is rung because pick up interrupter PU1 is connected through a break contact of relay CP, break contact of relay PU, conductor 112, break contact of relay PT, break contact of relay RA, conductor 110, make contact of relay SW and winding of relay PU to (−). This means that the first group of codes is conditioned for ringing the called station, the particular code used being selected by the position of wiper GEN of the minor switch, which wiper selects the coded sources of generator.

In the event that it is desired to have the first digit select the second group of codes, 11 to 20, the terminal B is connected to the bank contact of the level selected by the XX wiper corresponding to the number of the first digit used to select this level. In this example, it will be assumed that first digit 4 is used to select the second group of codes, 11 to 20, consequently terminal B will be cross connected to terminal 4 of the XX bank. Now when wiper XX is connected to (+) at the end of the first digit, the circuit extends through the jumper to terminal B, break contact of relay CP, conductor 123 and upper winding of relay CP to (−) for operating this relay which closes a locking circuit for itself extending from grounded conductor S, make contact of relay CP, conductor 123 and upper winding of relay CP to (−). This transfers the above described circuit of the PU relay from common pick up conductor PU1 to common pick up conductor PU2. This latter pick up conductor is coded with the second group of code combinations, 11 to 20, with the individual code in this group being selected by the position taken by wiper GEN of the minor switch. To understand just how this selection between the first and second groups of codes is made, this may be done in any one of several ways, for example, all of the generator source leads connected to the terminals of wiper GEN of the minor switch may lead to contacts of a relay or cam control contacts on the coding machine for making a selection between the first and second group of codes. Since common conductor PU1 is energized during the ringing cycle when the first group of codes are connected to the common generator source, one of the first group will be rung on a call when the CP relay is not operated and one of the second group will be rung on a call when the CP relay is operated because conductor PU2 is only energized during the cycle when the second group of codes is connected to the common conductors leading to the terminals of wiper GEN of the minor switch.

In a selector type system, the A and B terminals, as well as the G and G1 terminals are not used, the selection between the first and second group of codes being made by the first digit dialed into the selector. In the above example, it was assumed that the connector was selected by a particular level of the selector connected to conductors R, T, HS and S shown in the left hand portion of Fig. 6. Under this condition relay CP is not operated and pick up conductor PU1 is effective to ring the selected one of the first group of codes during the first portion of the ringing cycle. This same connector may be selected from another selector level in response to another first digit, thus selecting conductors XR, XT, XHS and XS instead of the previously mentioned conductors used in the previous example. In this case, the closed circuit across the calling telephone line is extended by way of conductor XR, break contact of relay CP, conductor 124, lower winding of relay CP, conductor 38, break contact of relay DD, another break contact of relay DD, break contact of relay AB, and winding of relay CB to (−). The calling line extended by way of conductor XT is connected through a break contact of relay TD, break contact of relay DD, break contact of relay AB and lower winding of relay CB to (+) by way of conductor 30. Consequently, relay CP is operated and locked to (+) on conductor S as previously described. As soon as relay CP operates, it transfers conductor XR to the upper winding of the CB relay by way of conductor 39, thus removing the lower winding of the CP relay from the line circuit. Now when relay RD operates, the ring side of the calling line, extended by way of conductors XR and 39, is connected to the winding of the CB relay by way of a make contact of relay RD, this contact closing before the contact is opened at the break contact of relay DD. Similarly, tip conductor XT is connected to the winding of the CB relay by way of a make contact of relay RD, which contact closes before the original circuit is opened at the break contact of the DD relay. This operation sets the ringing for using the second code group, in the previously described manner because relay CP is operated.

What is claimed is:

1. In an automatic telephone system, an automatic connector switch having line wipers, a line selectable by said connector switch and rung over said line wipers, a reversing relay, means to energize said reversing relay during dialing of the station digit, means to release said reversing relay a predetermined interval of time after dialing the station digit, said reversing relay being re-energized or not as determined by the station digit dialed into said connector switch, means controlled by said reversing relay for determining the side of said line to be rung over, a switching relay in said connector switch energized responsive to the idle condition of said line when selected by said connector switch, means including contacts of said switching relay for extending ringing current to said line when selected, and means including operated contacts of said reversing relay for preventing the energization of said switching relay during the transmission of the impulses of said station digit and for a predetermined interval of time thereafter when said reversing relay is first energized.

2. In an automatic telephone system, party lines, an automatic connector switch, a station code selector switch associated with said connector switch, means responsive to a local or a toll call for selecting and operating said connector switch for selecting any one of said lines in response to the dialing of two digits of a desired telephone number, means for automatically completing the connection to the called line in response to the dialing of the second of said two digits if the call is a toll call, means requiring the operation of said code selector switch for automatically completing the connection to the called line if the call is a local call, means to operate said code switch in response to the dialing of a third digit on either a local or toll call, and means controlled by the operation of said code selector switch for selecting the code signal to be used in ringing the called line when the call is either a local or a toll call.

3. In an automatic telephone system, a plurality of subscribers' lines, a group of trunk lines, a connector switch, means for operating said connector switch to establish connection with a desired subscriber's line or to select and establish connection with an idle trunk line, an impulse receiving relay and a lock pulse relay associated with said connector switch, a stepping magnet for said connector switch, means responsive to impulses received by said impulse receiving relay for operating said lock pulse relay, means controlled by said lock pulse relay when operated by said impulse receiving relay for repeating said impulses to said step magnet for selecting any one of said subscribers' lines, means independent of said received impulses for operating said lock pulse relay, and means controlled by said lock pulse relay when operated independent of said received impulses for automatically operating said stepping magnet for selecting any idle one of said trunk lines.

4. In an automatic telephone system, a plurality of subscribers' lines, a group of trunk lines, a connector switch, means for operating said connector switch to establish connection with a desired subscriber's line or to select and establish connection with an idle trunk line, an impulse receiving relay and a lock pulse relay associated with said connector switch, a stepping magnet for said connector switch, means responsive to impulses received by said impulse receiving relay for operating said lock pulse relay, means controlled by said lock pulse relay when operated by said impulse receiving relay for repeating said impulses to said stepping magnet for selecting any one of said subscribers' lines, means independent of said received impulses for operating said lock pulse relay, means controlled by said lock pulse relay when operated independent of said received impulses for automatically operating said stepping magnet for selecting any idle one of said trunk lines, additional locking means for said lock pulse relay effective when said connector switch stops on the last trunk line of a group and finds it busy, and means controlled by said lock pulse relay when locked by said additional locking means for stopping said switch on terminals associated with a busy trunk line.

5. In a telephone system, an automatic connector switch having line wipers, a line selectable by said connector switch and rung over said line wipers, a reversing relay, means to energize said reversing relay during the dialing of the digit prior to the station digit, a toll relay, means to operate said toll relay on calls from a toll operator, means responsive to the operation of said toll relay to effect the release of said reversing relay after the dialing of the digit prior to the station digit, a switching relay, means responsive to the idle condition of said line and including normal contacts of said reversing relay to energize said switching relay, means to re-energize said reversing relay as determined by the station digit dialed into the connector switch, means controlled by said reversing relay for determining the side of said line to be rung over, and means including operated contacts of said switching relay for extending ringing current to the selected side of the line to be rung over.

References Cited in the file of this patent

UNITED STATES PATENTS

| | | |
|---|---|---|
| 1,885,784 | Tees | Nov. 1, 1932 |
| 1,891,423 | Kahn | Dec. 20, 1932 |
| 2,113,119 | Taylor et al. | Apr. 5, 1938 |
| 2,154,785 | Taylor et al. | Apr. 18, 1939 |
| 2,289,503 | Koechling | July 14, 1942 |
| 2,419,282 | Ostline | Apr. 22, 1947 |
| 2,506,730 | Morris | May 9, 1950 |
| 2,542,272 | Bakker | Feb. 20, 1951 |
| 2,549,696 | Lomax | Apr. 17, 1951 |
| 2,583,782 | Lomax | Jan. 29, 1952 |